United States Patent
Choi et al.

(10) Patent No.: US 12,302,013 B2
(45) Date of Patent: *May 13, 2025

(54) IMAGE SIGNAL PROCESSOR, OPERATION METHOD OF IMAGE SIGNAL PROCESSOR, AND IMAGE SENSOR DEVICE INCLUDING IMAGE SIGNAL PROCESSOR

(71) Applicant: SAMSUNG ELECTRONICS CO., LTD., Suwon-si (KR)

(72) Inventors: Seungwon Choi, Hwaseong-si (KR); Ildo Kim, Suwon-si (KR); Jongseong Choi, Hwaseong-si (KR); Ji Hwan Park, Suwon-si (KR); Ser Hoon Lee, Yongin-si (KR); Sukhwan Lim, Seongnam-si (KR); Kyuyul Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,840

(22) Filed: Jan. 17, 2024

(65) Prior Publication Data

US 2024/0244342 A1    Jul. 18, 2024

Related U.S. Application Data

(63) Continuation of application No. 17/859,778, filed on Jul. 7, 2022, now Pat. No. 11,902,676.

(30) Foreign Application Priority Data

Jul. 7, 2021    (KR) .................. 10-2021-0088960
Dec. 21, 2021    (KR) .................. 10-2021-0183767

(51) Int. Cl.
*H04N 25/46*    (2023.01)
*G06T 5/50*    (2006.01)
*H04N 25/75*    (2023.01)

(52) U.S. Cl.
CPC ............ *H04N 25/46* (2023.01); *G06T 5/50* (2013.01); *H04N 25/75* (2023.01); *G06T 2207/10024* (2013.01); *G06T 2207/20016* (2013.01)

(58) Field of Classification Search
CPC ...... H04N 25/46; H04N 25/75; H04N 23/665; H04N 23/951; H04N 23/45; H04N 9/64;
(Continued)

(56) References Cited

U.S. PATENT DOCUMENTS 8,446,424 B2    5/2013    Sato
8,786,625 B2    7/2014    Cote et al.
(Continued)

FOREIGN PATENT DOCUMENTS

KR    101217476 B1    1/2013

OTHER PUBLICATIONS

Chiu et al., "Calibration-Based Auto White Balance Method for Digital Still Camera," Journal of Information Science and Engineering, vol. 26, pp. 713-723, Mar. 2010, Total 12 pages.

*Primary Examiner* — Kelly L Jerabek
(74) *Attorney, Agent, or Firm* — Sughrue Mion, PLLC

(57) ABSTRACT

Provided are image signal processing apparatuses and methods for operating the same. In an embodiment, the image signal processing apparatus is configured to receive, from an image sensor device, an input image. The apparatus is further configured to perform a binning and crop operation on the input image to generate a first image. The apparatus is further configured to perform a Bayer domain processing on the first image to generate a second image. The apparatus (Continued)

is further configured to perform RGB domain processing on the second image to generate a third image. The apparatus is further configured to perform YUV domain processing on the third image to generate an output image. The YUV domain processing comprises at least one of a spatial de-noising operation, a temporal de-noising operation, a motion compensation operation, a tone mapping operation, a detail enhance operation, and a sharpening operation.

20 Claims, 18 Drawing Sheets

(58) Field of Classification Search
CPC .... G06T 5/50; G06T 7/10; G06T 5/70; G06T 2207/10024; G06T 2207/20016; G06T 2207/20132; G06T 2207/20216
See application file for complete search history.

(56) References Cited

U.S. PATENT DOCUMENTS

| | | |
|---|---|---|
| 9,142,012 B2 | 9/2015 | Lim et al. |
| 9,860,429 B1 | 1/2018 | Silverstein et al. |
| 9,995,578 B2 | 6/2018 | Ge et al. |
| 10,902,558 B2 | 1/2021 | Ferres et al. |
| 11,902,676 B2 * | 2/2024 | Choi .................... H04N 23/665 |
| 2019/0156516 A1 | 5/2019 | Nikkanen et al. |
| 2020/0077026 A1 * | 3/2020 | Jeong .................. H04N 1/2112 |
| 2021/0090222 A1 | 3/2021 | Lee |
| 2021/0168304 A1 | 6/2021 | Song et al. |
| 2022/0166936 A1 | 5/2022 | Kim |

\* cited by examiner

IMAGE SIGNAL PROCESSOR, OPERATION METHOD OF IMAGE SIGNAL PROCESSOR, AND IMAGE SENSOR DEVICE INCLUDING IMAGE SIGNAL PROCESSOR

CROSS-REFERENCE TO RELATED APPLICATIONS

This application is a continuation application of U.S. patent application Ser. No. 17/859,778, filed on Jul. 7, 2022, which claims priority to Korean Patent Application No. 10-2021-0183767, filed on Dec. 21, 2021, and to Korean Patent Application No. 10-2021-0088960, filed on Jul. 7, 2021, in the Korean Intellectual Property Office, the disclosures of which are incorporated by reference herein in their entireties.

BACKGROUND

Embodiments of the inventive concept described herein relate to an image system, and more particularly, relate to an image signal processor, an operation method of the image signal processor, and an image sensor device including the image signal processor.

An image sensor included in a smartphone, a tablet, a personal computer (PC), or a digital camera obtains image information about an external object by converting a light reflected from the external object into an electrical signal. Various image signal processing operations are performed to convert an electrical signal obtained from the image sensor into image information perceivable by a person and/or to improve the quality of image.

SUMMARY

Embodiments of the present disclosure provide an image signal processor having improved performance and reduced power consumption, an operation method of the image signal processor, and an image sensor device including the image signal processor.

According to an embodiment, an image signal apparatus includes a memory storage and an image signal processor communicatively coupled to the memory storage. The image signal processor is configured to cause the image signal apparatus to receive, from a first image sensor device, a first input image. The image signal processor is further configured to further cause the image signal apparatus to perform a binning and crop operation on the first input image to generate a first image. The image signal processor is further configured to further cause the image signal apparatus to perform Bayer domain processing on the first image to generate a second image. The image signal processor is further configured to further cause the image signal apparatus to perform RGB domain processing on the second image to generate a third image. The image signal processor is further configured to further cause the image signal apparatus to perform YUV domain processing on the third image to generate an output image. The YUV domain processing includes at least one of a spatial de-noising operation, a temporal de-noising operation, a motion compensation operation, a tone mapping operation, a detail enhance operation, and a sharpening operation.

According to an embodiment, an operation method of an image signal processor includes receiving, from an image sensor device, an input image. The operation method further includes performing a binning and crop operation on the input image to generate a first image. The operation method further includes performing Bayer domain processing on the first image to generate a second image. The operation method further includes performing RGB domain processing on the second image to generate a third image. The operation method further includes performing YUV domain processing on the third image to generate an output image. The performing of the YUV domain processing includes outputting the output image. A resolution of the second image matches a resolution of the third image. The YUV domain processing includes at least one of a spatial de-noising operation, a temporal de-noising operation, a motion compensation operation, a tone mapping operation, a detail enhance operation, and a sharpening operation.

According to an embodiment, an image sensor device includes a pixel array that includes a plurality of pixels, a row driver that controls the plurality of pixels, an analog-to-digital converter that converts pixel signals into digital signals, an output buffer that outputs an input image based on the digital signals, and an image signal processor configured to generate an output image based on the input image. The image signal processor is further configured to generate frame information based on the input image. The image signal processor is further configured to perform a binning and crop operation on the input image to generate a first image. The image signal processor is further configured to perform Bayer domain processing on the first image based on the frame information to generate a second image. The image signal processor is further configured to perform RGB domain processing on the second image based on the frame information to generate a third image. The image signal processor is further configured to perform YUV domain processing on the third image based on the frame information to generate the output image. The YUV domain processing includes at least one of a spatial de-noising operation, a temporal de-noising operation, a motion compensation operation, a tone mapping operation, a detail enhance operation, and a sharpening operation.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that an ordinary one in the art easily implements the invention. In the description below, the terms "block", "unit", "module", etc. or components corresponding to the terms may be implemented in the form of software, hardware, or a combination thereof.

Figure 1:
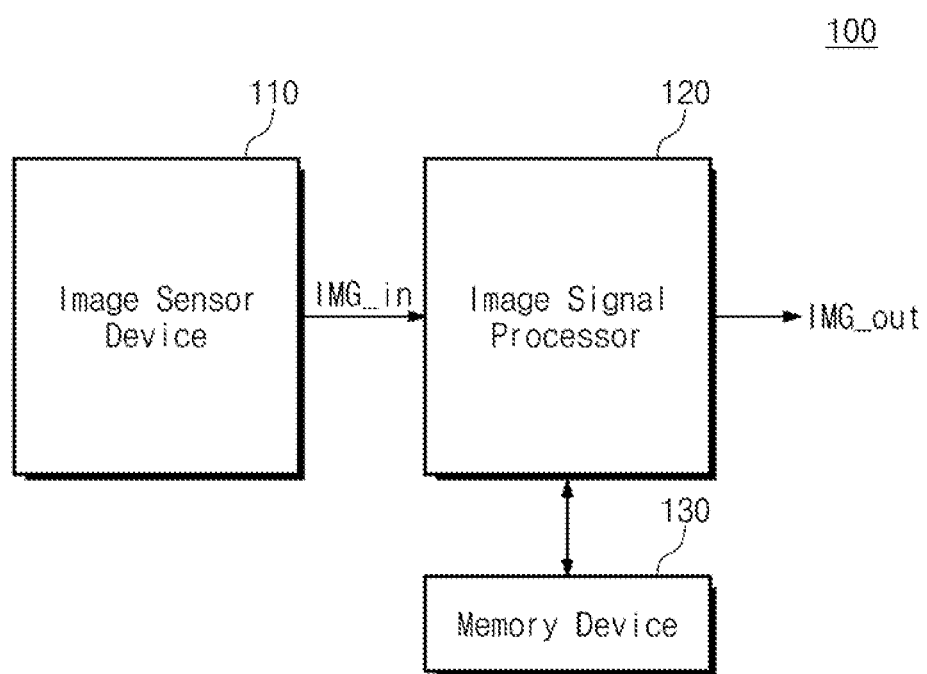
FIG. 1 is a block diagram illustrating an image system according to an embodiment of the present disclosure.

FIG. 1 is a block diagram illustrating an image system according to an embodiment of the present disclosure. Referring to FIG. 1, an image system 100 includes an image sensor device 110, an image signal processor (ISP) 120, and a memory device 130. The image system 100 may be included in various computing systems such as a desktop computer, a laptop computer, a tablet computer, a smartphone, a wearable device, a black box, and a digital camera.

The image sensor device 110 may generate image data based on a light incident from the outside. For example, the image sensor device 110 may include a plurality of pixels. Each of the plurality of pixels may be configured to output an electrical signal corresponding to the light incident from the outside. The image sensor device 110 may output the image data based on the electrical signal. In an embodiment, the image data generated by the image sensor device 110 may be provided to the image signal processor 120 as an input image IMG_in.

The image signal processor 120 may receive the input image IMG_in from the image sensor device 110. The image signal processor 120 may perform various signal processing operations on the received input image IMG_in to generate an output image IMG_out. For example, the image signal processor 120 may perform various image signal processing operations such as a de-noising operation, a tone-mapping operation, a detail enhancing operation, a white balancing operation, a gamma correction operation, a de-mosaic operation, a sharpening operation, and a color conversion operation.

In an embodiment, a domain or color pattern of the input image IMG_in output from the image sensor device 110 may be different from a domain or color pattern of the output image IMG_out output from the image signal processor 120. For example, the domain or color pattern of the input image IMG_in output from the image sensor device 110 may be a BYR domain (Bayer Domain), and the domain or color pattern of the output image IMG_out output from the image signal processor 120 may be a YUV domain.

In an embodiment, the domain or color pattern of the input image IMG_in output from the image sensor device 110 may be the same as (e.g. matches) a domain or color pattern of a color filter array (CFA) of the image sensor device 110. A size (e.g., resolution) of the input image IMG_in output from the image sensor device 110 may be different from a size (e.g., resolution) of the output image IMG_out output from the image signal processor 120.

In an embodiment, the image signal processor 120 may perform the various image signal processing operations described above, by changing the domain and the size of the input image IMG_in. An operation of the image signal processor 120 according to an embodiment of the present disclosure will be described in detail with reference to the following drawings.

The memory device 130 may be configured to store various data, various information, or various image data that are used by the image signal processor 120. In an embodiment, the memory device 130 may be a high-speed memory device such as a dynamic random access memory (DRAM).

Figure 2:
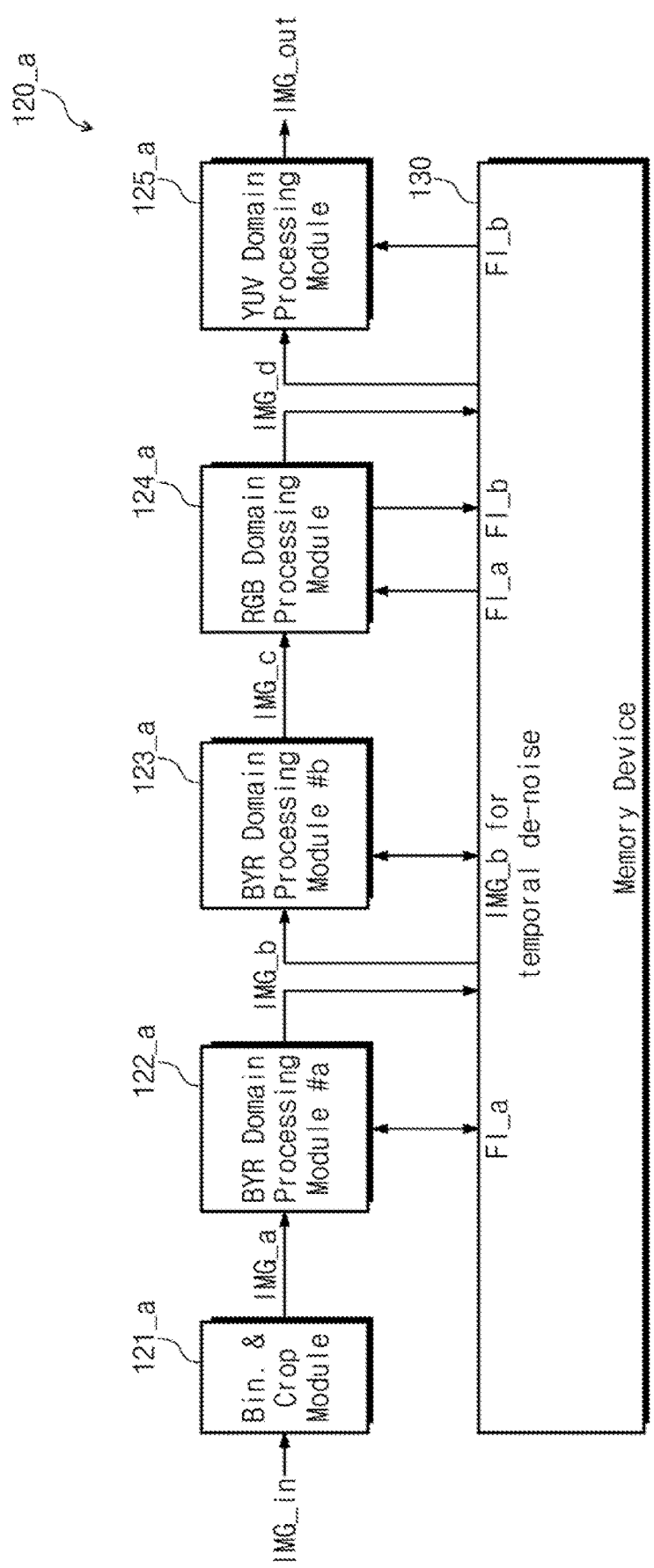
FIG. 2 is a block diagram illustrating the architecture of an image signal processor of FIG. 1.
Figure 3:
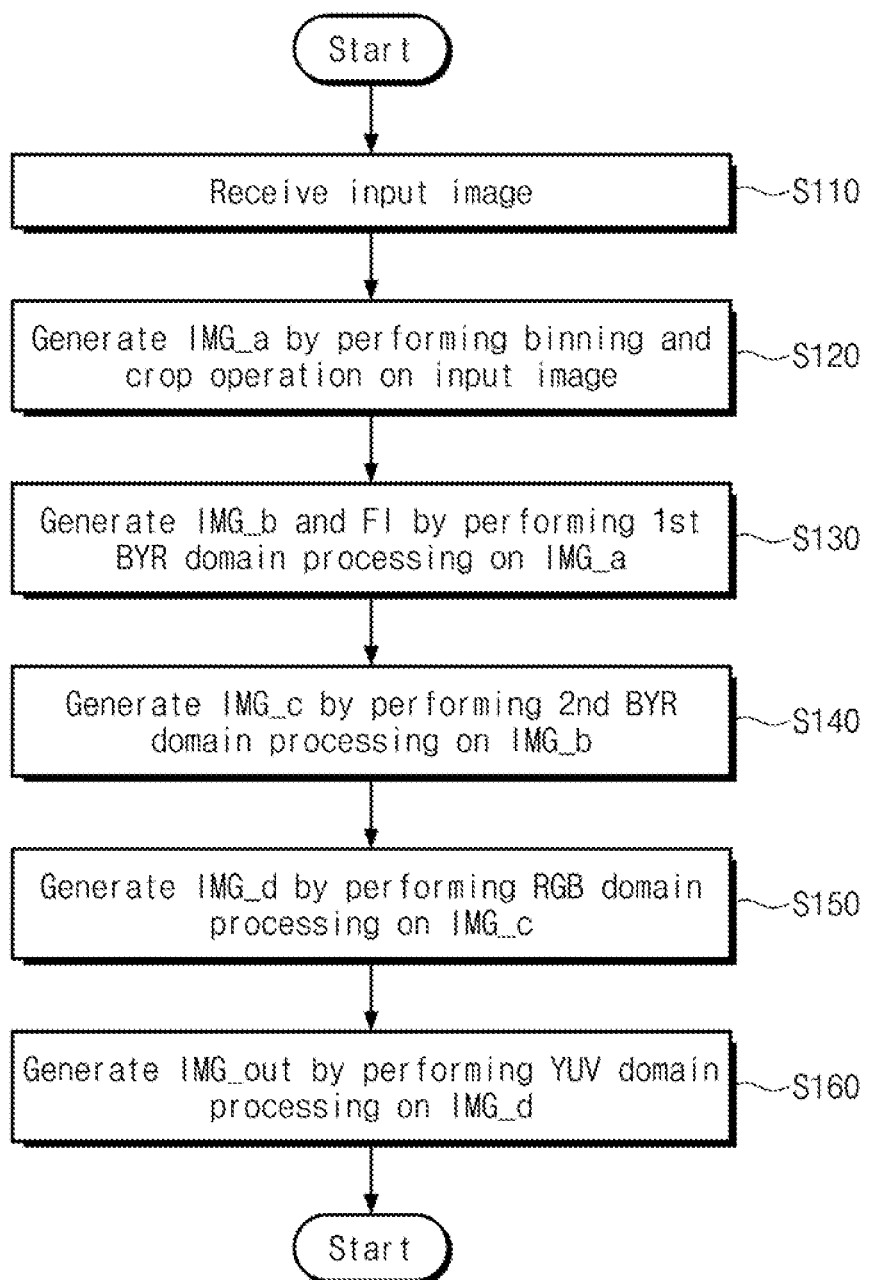
FIG. 3 is a flowchart illustrating an operation of an image signal processor of FIG. 2.

FIG. 2 is a block diagram illustrating the architecture of an image signal processor of FIG. 1. FIG. 3 is a flowchart illustrating an operation of an image signal processor of FIG. 2. Referring to FIGS. 1, 2, and 3, a first image signal processor 120_a may include a binning and crop module 121_a, a first Bayer (BYR) domain processing module 122_a, a second BYR domain processing module 123_a, an RGB domain processing module 124_a, and a YUV domain processing module 125_a.

In operation S110 of FIG. 3, the first image signal processor 120_a may receive the input image IMG_in. For example, the first image signal processor 120_a may directly receive the input image IMG_in from the image sensor device 110. Alternatively or additionally, the image sensor device 110 may store the input image IMG_in in the memory device 130, and the first image signal processor 120_a may access the memory device 130 to read the input image IMG_in.

In an embodiment, the color pattern or domain of the input image IMG_in may be the BYR domain. However, the present disclosure is not limited thereto. For example, the input image IMG_in may have the color pattern or domain (e.g., a BYR domain, a tetra domain, a nona domain, a hexa domain, or a deca domain) that is the same as (e.g., matches) the color pattern of the color filter array (CFA) of the image sensor device 110.

In operation S120 of FIG. 3, the first image signal processor 120_a may generate an a-th image IMG_a by performing a binning and crop operation on the input image IMG_in. For example, the binning and crop module 121_a of the first image signal processor 120_a may generate the a-th image IMG_a by performing the binning and crop operation on the input image IMG_in. In an embodiment, the a-th image IMG_a may have the BYR domain or the Bayer color pattern. For example, in the case where the input image IMG_in is the BYR domain, the a-th image IMG_a may have the BYR domain without a separate binning operation. Alternatively or additionally, in the case where the input image IMG_in is not the BYR domain (e.g., a tetra domain, a nona domain, a hexa domain, or a deca domain), the a-th image IMG_a may have the BYR domain through the binning operation of the binning and crop module 121_a on the input image IMG_in.

In an embodiment, a size of the a-th image IMG_a may be smaller than or equal to a size of the input image IMG_in. For example, the binning and crop module 121_a may determine a specific area of the input image IMG_in as the a-th image IMG_a through the crop operation on the input image IMG_in. The a-th image IMG_a generated by the binning and crop module 121_a may be transferred to the first BYR domain processing module 122_a.

In operation S130 of FIG. 3, the first image signal processor 120_a may generate a b-th image IMG_b and a-th frame information FI_a by performing first BYR domain processing on the a-th image IMG_a. For example, the first BYR domain processing module 122_a of the first image signal processor 120_a may extract the a-th frame information FI_a based on the a-th image IMG_a. The a-th frame information FI_a may include information, which is used for an image signal processing operation, such as image pyramid information about the frame (e.g., entire or whole frame) or each area (e.g., a portion of the frame or input image) of the input image IMG_in, average/distribution/histogram information for each area, or motion information. The a-th frame information FI_a thus generated may be stored in the memory device 130.

The first BYR domain processing module 122_a of the first image signal processor 120_a may generate the b-th image IMG_b by performing various image signal processing operations on the a-th image IMG_a. In an embodiment, a size of the b-th image IMG_b may be smaller than or equal to the size of the a-th image IMG_a. The b-th image IMG_b may have the BYR domain or a BYR color pattern.

In operation S140 of FIG. 3, the first image signal processor 120_a may generate a c-th image IMG_c by performing second BYR domain processing on the b-th image IMG_b. For example, the second BYR domain processing module 123_a of the first image signal processor 120_a may generate the c-th image IMG_c by performing second BYR domain processing on the b-th image IMG_b by using the a-th frame information FI_a stored in the memory device 130. In an embodiment, a size of the c-th image IMG_c may be the same as the size of the b-th image IMG_b. The c-th image IMG_c may have the RGB domain or an RGB color pattern.

In an embodiment, the second BYR domain processing module 123_a may perform a temporal de-noising operation on the b-th image IMG_b. In this case, for the temporal de-noising operation, the second BYR domain processing module 123_a may store the b-th image IMG_b in the memory device 130 and may access the b-th image IMG_b stored therein.

In operation S150 of FIG. 3, the first image signal processor 120_a may generate a d-th image IMG_d by performing RGB domain processing on the c-th image IMG_c. For example, the RGB domain processing module 124_a of the first image signal processor 120_a may generate the d-th image IMG_d by performing RGB domain processing on the c-th image IMG_c by using the a-th frame information FI_a stored in the memory device 130. In an embodiment, a size of the d-th image IMG_d may be smaller than or equal to the size of the c-th image IMG_c. The d-th image IMG_d may have the YUV domain or a YUV color pattern.

For example, the RGB domain processing module 124_a may extract b-th frame information FI_b based on the c-th image IMG_c. The b-th frame information FI_b may include frame information about the YUV domain (e.g., image pyramid information about the whole frame or each area, average/distribution/histogram information for each area, or motion information). The second frame information FI_b may be stored in the memory device 130.

In operation S160 of FIG. 3, the first image signal processor 120_a may generate the output image IMG_out by performing YUV domain on the d-th image IMG_d. For example, the YUV domain processing module 125_a of the first image signal processor 120_a may generate the output image IMG_out by performing YUV domain processing on the d-th image IMG_d by using the second frame information FI_b stored in the memory device 130.

Figure 4:
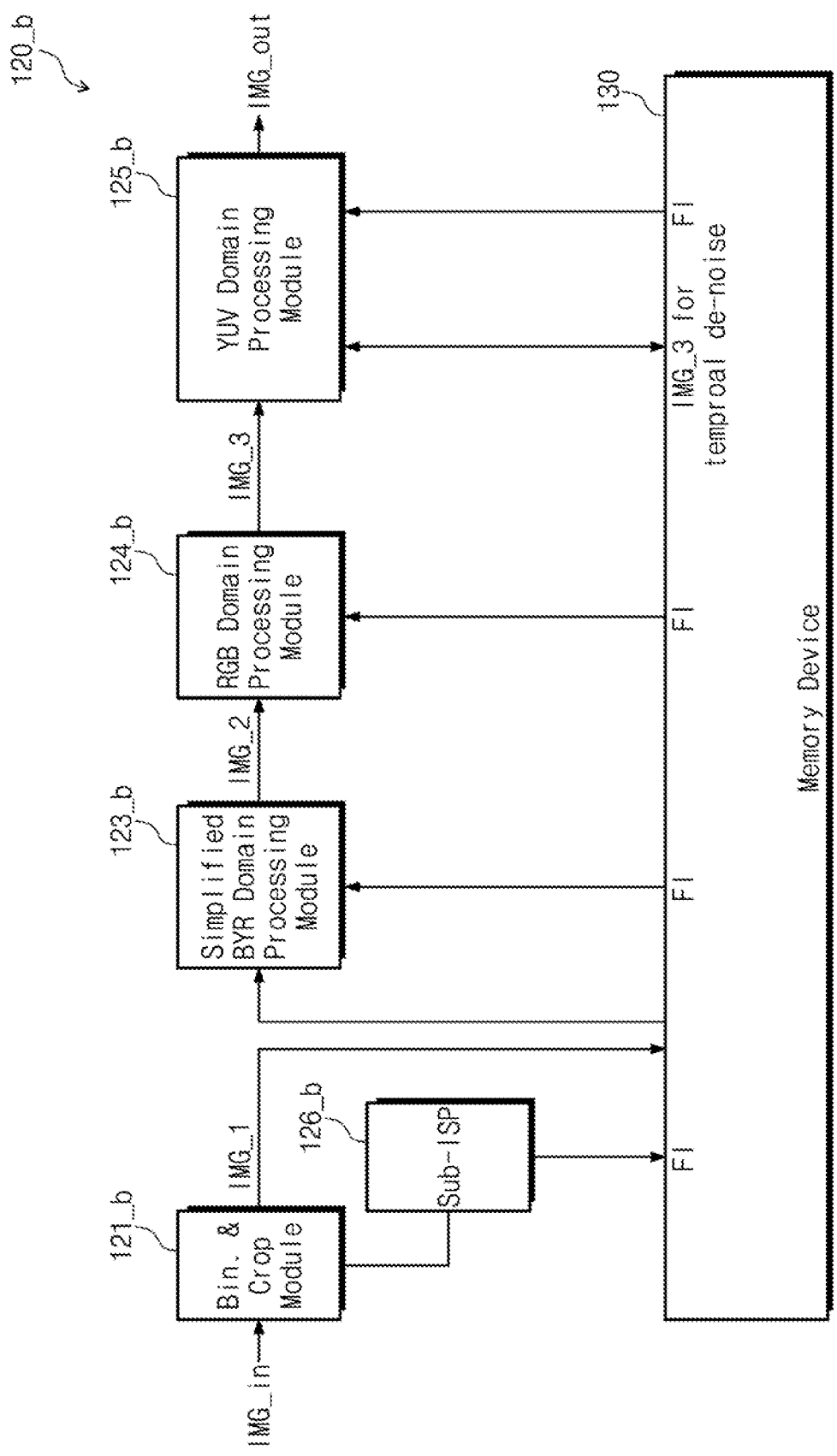
FIG. 4 is a block diagram illustrating the architecture of an image signal processor.
Figure 5:
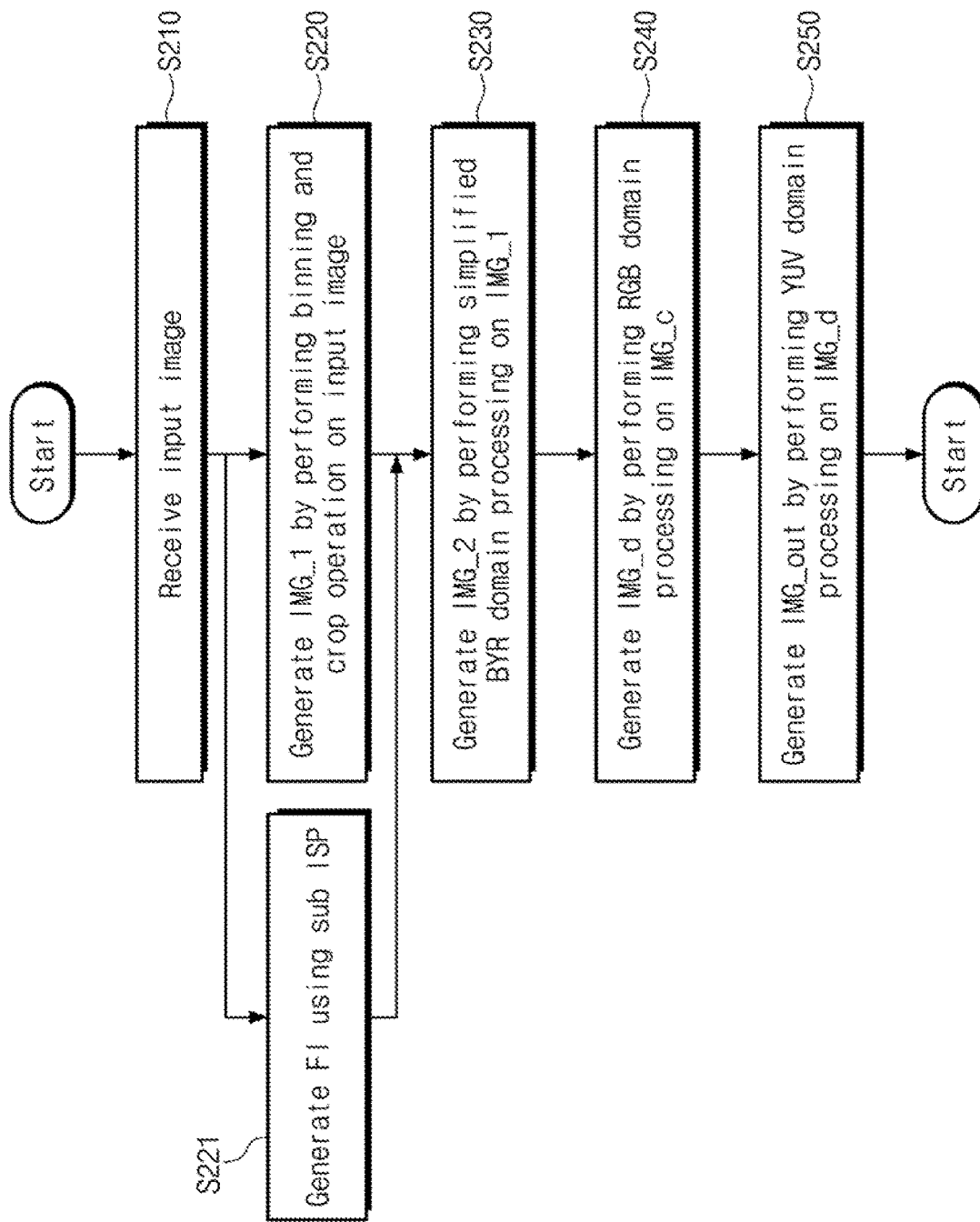
FIG. 5 is a flowchart illustrating an operation of an image signal processor of FIG. 4.

FIG. 4 is a block diagram illustrating the architecture of an image signal processor. FIG. 5 is a flowchart illustrating an operation of an image signal processor of FIG. 4. Referring to FIGS. 1, 4, and 5, a second image signal processor 120_b may include a binning and crop module 121_b, a simplified BYR domain processing module 123_b, an RGB domain processing module 124_b, a YUV domain processing module 125_b, and a sub-ISP module 126_b.

In operation S210 of FIG. 5, the second image signal processor 120_b may receive the input image IMG_in. For example, the second image signal processor 120_b may directly receive the input image IMG_in from the image sensor device 110. Alternatively or additionally, the image sensor device 110 may store the input image IMG_in in the memory device 130, and the second image signal processor 120_b may access the memory device 130 to read the input image IMG_in. In an embodiment, the input image IMG_in may have a color pattern or domain that is the same as (e.g., matches) the color pattern of the color filter array (CFA) of the image sensor device 110. For example, the color pattern or domain of the input image IMG_in may be the BYR domain.

In operation S220 of FIG. 5, the second image signal processor 120_b may generate a first image IMG_1 by performing the binning and crop operation on the input image IMG_in. For example, the binning and crop module 121_b of the second image signal processor 120_b may generate the first image IMG_1 by performing the binning and crop operation on the input image IMG_in.

In an embodiment, the first image IMG_1 may have the BYR domain or the BYR color pattern. For example, in the case where the input image IMG_in is the BYR domain, the first image IMG_1 may have the BYR domain without a separate binning operation. Alternatively or additionally, in the case where the input image IMG_in is not the BYR domain (e.g., a tetra domain, a nona domain, a hexa domain, or a deca domain), the first image IMG_1 may have the BYR domain through the binning operation of the binning and crop module 121_b on the input image IMG_in.

In an embodiment, a size of the first image IMG_1 may be smaller than or equal to a size of the input image IMG_in. For example, the binning and crop module 121_b may determine a specific area of the input image IMG_in as the first image IMG_1 through the crop operation on the input image IMG_in.

In an embodiment, the first image IMG_1 may be a downscaled image. The first image IMG_1 generated by the binning and crop module 121_b may be transferred to the simplified BYR domain processing module 123_a or the sub-ISP module 126, or may be stored in the memory device 130.

In operation S221 of FIG. 5, the second image signal processor 120_b may generate frame information FI by using the sub-ISP module 126_b. For example, the sub-ISP module 126_b of the second image signal processor 120_b may generate the frame information FI based on the first image IMG_1 generated by the binning and crop module 121_b. In an embodiment, the frame information FI may include information, which is used for an image signal processing operation, such as image pyramid information about the whole frame or each area, average/distribution/ histogram information for each area, or motion information. The frame information FI thus generated may be stored in the memory device 130. In an embodiment, operation S221 may be performed before operation S230. That is, the sub-ISP module 126_b of the second image signal processor 120_b may generate the frame information FI in advance before BYR domain processing, RGB domain processing, and YUV domain processing are performed.

In operation S230 of FIG. 5, the second image signal processor 120_b may generate a second image IMG_2 by performing simplified BYR domain processing on the first image IMG_1. For example, the simplified BYR domain processing module 123_b of the second image signal processor 120_b may generate the second image IMG_2 by performing simplified BYR domain processing on the first image IMG_1 by using the frame information FI stored in the memory device 130. In an embodiment, a size of the second image IMG_2 may be smaller than or equal to a size of the first image IMG_1 and may have the RGB domain or RGB color pattern. In an embodiment, the simplified BYR domain processing may mean a reduced processing operation or a relatively simple processing operation compared to the processing operation performed by the first BYR domain processing module 122_a and the second BYR domain processing module 123_b described with reference to FIG. 2. That is, through the simplified BYR domain processing, a processing operation for an image of an original size (or a relatively large size) may be reduced or may be performed only by a relatively simple operation.

In operation S240, the second image signal processor 120_b may generate a third image IMG_3 by performing RGB domain processing on the second image IMG_2. For example, the RGB domain processing module 124_b of the second image signal processor 120_b may generate the third image IMG_3 by performing RGB domain processing on the second image IMG_2 by using the frame information FI stored in the memory device 130. In an embodiment, a size of the third image IMG_3 may be the same as the size of the second image IMG_2 and may have the YUV domain or YUV color pattern.

In operation S250, the second image signal processor 120_b may generate the output image IMG_out by performing YUV domain processing on the third image IMG_3. The YUV domain processing module 125_b of the second image signal processor 120_b may generate the output image IMG_out by performing YUV domain processing on the third image IMG_3 by using the frame information FI stored in the memory device 130.

In an embodiment, the YUV domain processing module 125_b of the second image signal processor 120_b may perform image signal processing operations that are performed by the second BYR domain processing module 123_a of the first image signal processor 120_a. For example, the YUV domain processing module 125_b may perform the temporal de-noising operation. In this case, for the temporal de-noising operation, the YUV domain processing module 125_b may store the second image IMG_2 in the memory device 130 and may access the second image IMG_2 stored therein.

As illustrated in FIGS. 2 to 5, each of the image signal processors 120_a and 120_b may generate the output image IMG_out by performing various image signal processing operations on the input image IMG_in received from the image sensor device 110.

In an embodiment, to apply original information of the input image IMG_in to the output image IMG_out, each of the image signal processors 120_a and 120_b may perform an image signal processing operation for the BYR domain before the conversion to the domain (e.g., the YUV domain) of the output image IMG_out. As an example, in the case where the amount of signal processing or computation for images having the BYR domain increases, power consumption may increase.

In an embodiment, the size of the input image IMG_in may be different from the size of the output image IMG_out. In this case, each of the image signal processors 120_a and 120_b may perform various signal processing operations after reducing (e.g., downscaling) the size of the input image IMG_in. However, in the case where a signal processing operation is performed on the downscaled image, the quality of the final output image IMG_out may be degraded. In contrast, in the case where a signal processing operation is performed without downscaling, the quality of the final output image IMG_out may be maintained, but power consumption may increase.

An image signal processor (in particular, 120_b) according to an embodiment of the present disclosure may overall reduce power consumption by simplifying BYR domain processing requiring large power consumption and performing some image signal processing operations (e.g., a de-noising operation, a tone-mapping operation, and a detail enhancing operation), which are to be performed in the BYR domain processing, in the YUV domain processing. In addition, because the image signal processor (in particular, 120_b) according to an embodiment of the present disclosure performs only minimum BYR domain processing on the downscaled image, power consumption may be reduced, and the reduction of the quality of the output image IMG_out may be prevented.

In detail, to compare power consumption of the image signal processors 120_a and 120_b of FIGS. 2 and 4 and a power (or bandwidth) used for an access to the memory device 130, sizes of images respectively generated by the image signal processors 120_a and 120_b are defined as shown in Table 1 below. An image size and an image bit depth of each image that is obtained under the condition that the resolution of the output image IMG_out is an FHD (i.e., 1920×1080) and a YUV domain processing module operates with the YUV42 format are shown in Table 1.

TABLE 1

| Image | Image Size | Image Bit Depth |
|---|---|---|
| Output of 121_a and Input of 122_a | IMG_a | Ka × La = [4032 × 2268] | Na = 10 |
| Output of 122_a and Input of 123_a | IMG_b | Kb × Lb = [4032 × 2268] | Nb = 12 |
| Output of 123_a and Input of 124_a | IMG_c | Kc × Lc = [4032 × 2268] | Nc = 12 |
| Output of 124_a and Input of 125_a | IMG_d | Kd × Ld = [1920 × 1080] | Nd = 12 |
| Output of 121_b and Input of 123_b | IMG_1 | K1 × L1 = [4032 × 2268] | N1 = 10 |
| Output of 123_b and Input of 124_b | IMG_2 | K2 × L2 = [1920 × 1080] | N2 = 12 |
| Output of 124_b and Input of 125_b | IMG_3 | K3 × L3 = [1920 × 1080] | N3 = 12 |

As shown in Table 1, in the case where a size of each image is determined, a power that is used for an access to the memory device 130 in each of the image signal processors 120_a and 120_b is expressed by Equation 1 below.

$$MP_{120_b} = 2 \cdot K1 \cdot L1 \cdot N1 = 182{,}891{,}520 \frac{\text{bits}}{\text{frame}} \quad [\text{EQUATION 1}]$$

-continued $$MP_{120_a} = 2 \cdot Kb \cdot Lb \cdot Nb + 2 \cdot Kd \cdot Ld \cdot Nd \cdot Nch = 319,002,624 \frac{\text{bits}}{\text{frame}}$$

$$\frac{MP_{120_b}}{MP_{120_a}} = 15.33\%$$

In Equation 1, $MP_{120\_b}$ may indicate the power consumption of the second image signal processor 120_b of FIG. 4, $MP_{120\_a}$ may indicate the power consumption of the first image signal processor 120_a of FIG. 2, Nch may indicate the number of effective channels of a YUV image in the YUV420 format, and Nch may be 2. In this case, the power consumption indicates power consumption that is used to access the memory device 130 for the purpose of processing one frame. As shown in Equation 1, the power consumption of the second image signal processor 120_b of FIG. 4 is 57.33% of the power consumption of the first image signal processor 120_a of FIG. 2. That is, power consumption may be reduced through the architecture of the second image signal processor 120_b illustrated in FIG. 4. As a result, the power consumption that is used to access the memory device 130 may be reduced by simplifying the BYR domain processing operation for an image and performing the simplified operation in the YUV domain.

In an embodiment, the embodiment of Table 1 and Equation 1 is an example in which an image is not downscaled during the BYR domain processing in the first image signal processor 120_a of FIG. 2. That is, to reduce power consumption, in the first image signal processor 120_a of FIG. 2, an image may be downscaled during the BYR domain processing. In this case, sizes of images respectively generated by the image signal processors 120_a and 120_b are defined as shown in Table 2 below. Similar to the Table 1 described above, Table 2 below relates to an example in which the resolution of the output image IMG_out is an FHD (i.e., 1920×1080) and a YUV domain processing module operates with the YUV42 format.

TABLE 2

| | Image | Image Size | Image Bit Depth |
|---|---|---|---|
| Output of 121_a and Input of 122_a | IMG_a | Ka × La = [4032 × 2268] | Na = 10 |
| Output of 122_a and Input of 123_a | IMG_b | Kb × Lb = [2880 × 1620] | Nb = 12 |
| Output of 123_a and Input of 124_a | IMG_c | Kc × Lc = [2880 × 1620] | Nc = 12 |
| Output of 124_a and Input of 125_a | IMG_d | Kd × Ld = [1920 × 1080] | Nd = 12 |
| Output of 121_b and Input of 123_b | IMG_1 | K1 × L1 = [4032 × 2268] | N1 = 10 |
| Output of 123_b and Input of 124_b | IMG_2 | K2 × L2 = [1920 × 1080] | N2 = 12 |
| Output of 124_b and Input of 125_b | IMG_3 | K3 × L3 = [1920 × 1080] | N3 = 12 |

As shown in Table 2, in the case where a size of each image is determined, a power that is used for an access to the memory device 130 in each of the image signal processors 120_a and 120_b is expressed by Equation 2 below.

$$MP_{120_b} = 2 \cdot K1 \cdot L1 \cdot N1 = 182,891,520 \frac{\text{bits}}{\text{frame}} \quad \text{[EQUATION 2]}$$

$$MP_{120_a} = 2 \cdot Kb \cdot Lb \cdot Nb + 2 \cdot Kd \cdot Ld \cdot Nd \cdot Nch = 248,832,000 \frac{\text{bits}}{\text{frame}}$$

-continued $$\frac{MP_{120_b}}{MP_{120_a}} = 73.5\%$$

Variables of Equation 2 are described above in reference to Equation 1, and thus, additional description will be omitted to avoid redundancy. Compared to the embodiment of Table 1 and Equation 1, in the embodiment of Table 2 and Equation 2, a reduction ratio of power consumption of the second image signal processor 120_b according to an embodiment of the present disclosure may be relatively low. However, according to the embodiment of Table 2 and Equation 2, because the first image signal processor 120_a downscales an image during the BYR domain processing, the quality of the final output image IMG_out may be reduced.

In an embodiment, Table 3 below shows sizes of images in the case where the resolution of the output image IMG_out is an UHD (i.e., 3840×2160) and a YUV domain processing module operates with the YUV42 format.

TABLE 3

| | Image | Image Size | Image Bit Depth |
|---|---|---|---|
| Output of 121_a and Input of 122_a | IMG_a | Ka × La = [4032 × 2268] | Na = 10 |
| Output of 122_a and Input of 123_a | IMG_b | Kb × Lb = [3840 × 2160] | Nb = 12 |
| Output of 123_a and Input of 124_a | IMG_c | Kc × Lc = [3840 × 2160] | Nc = 12 |
| Output of 124_a and Input of 125_a | IMG_d | Kd × Ld = [3840 × 2160] | Nd = 12 |
| Output of 121_b and Input of 123_b | IMG_1 | K1 × L1 = [3840 × 2160] | N1 = 10 |
| Output of 123_b and Input of 124_b | IMG_2 | K2 × L2 = [3840 × 2160] | N2 = 12 |
| Output of 124_b and Input of 125_b | IMG_3 | K3 × L3 = [3840 × 2160] | N3 = 12 |

As shown in Table 3, in the case where a size of each image is determined, a power that is used for an access to the memory device 130 in each of the image signal processors 120_a and 120_b is expressed by Equation 3 below.

$$MP_{120_b} = 2 \cdot K1 \cdot L1 \cdot N1 = 182,891,520 \frac{\text{bits}}{\text{frame}} \quad \text{[EQUATION 3]}$$

$$MP_{120_a} = 2 \cdot Kb \cdot Lb \cdot Nb + 2 \cdot Kd \cdot Ld \cdot Nd \cdot Nch = 597,196,800 \frac{\text{bits}}{\text{frame}}$$

$$\frac{MP_{120_b}}{MP_{120_a}} = 30.6\%$$

Variables of Equation 3 are described above in reference to Equation 1, and thus, additional description will be omitted to avoid redundancy. Compared to the embodiment of Table 1 and Equation 1 or the embodiment of Table 2 and Equation 2, in the embodiment of Table 3 and Equation 3, a reduction ratio of power consumption of the second image signal processor 120_b according to an embodiment of the present disclosure may be relatively high. That is, the power consumption of the second image signal processor 120_b may be reduced relatively greatly. The power consumption reduction may be caused by a downscaling ratio of the second image signal processor 120_b that may not be relatively large in a case where the resolution of the output image IMG_out is the UHD.

The power consumption necessary to access the memory device 130 of the second image signal processor 120_b may be reduced as described with reference to Table 1 to Table 3 and Equation 1 to Equation 3. Alternatively or additionally, computation amounts of modules included in the second image signal processor 120_b may be reduced. A computational amount of each module of the first and second image signal processors 120_a and 120_b may be determined using Equation 4 below.

$$CP_{123_b} + CP_{124_b} + CP_{125_b} = 1 \quad \text{[EQUATION 4]}$$
$$CP_{122_a} + CP_{123_a} + CP_{124_a} + CP_{125_a} = 1$$

Referring to Equation 4, it may be assumed that a computational amount for 1-bit image signal processing in each of the first and second image signal processors 120_a and 120_b is "1". $CP_{123\_b}$, $CP_{124\_b}$, and $CP_{125\_b}$ may indicate computational amounts of the simplified BYR domain processing module 123_b, the RGB domain processing module 124_b, and the YUV domain processing module 125_b of the second image signal processor 120_b, respectively. $CP_{122\_a}$, $CP_{123\_a}$, $CP_{124\_a}$, and $CP_{125\_a}$ indicate computational amounts of the first BYR domain processing module 122_a, the second BYR domain processing module 123_a, the RGB domain processing module 124_a, and the YUV domain processing module 125_a of the first image signal processor 120_a, respectively.

To compare the computational amounts of the first and second image signal processors 120_a and 120_b, a computational amount of each module may be determined as shown in Equation 5 such that the condition of Equation 4 is satisfied.

$$CP_{123_b} = 0.2, P_{124_b} = 0.2, P_{125_b} = 0.6 \quad \text{[EQUATION 5]}$$
$$P_{122_a} = 0.2, P_{123_a} = 0.4, P_{124_a} = 0.2, P_{125_a} = 0.2$$

In the case where the resolution of the output image IMG_out is the FHD (i.e., 1920× 1080), images that are respectively processed by the first and second image signal processors 120_a and 120_b may have the sizes shown in Table 1. In this case, computational amounts of the first and second image signal processors 120_a and 120_b may be expressed by Equation 6 below.

$$CP_{120_b} = \quad \text{[EQUATION 6]}$$
$$K1 \cdot L1 \cdot N1 \cdot CP_{123_b} + K2 \cdot L2 \cdot N2 \cdot Nrgb \cdot P_{124_b} +$$
$$K3 \cdot L3 \cdot N3 \cdot Nyuv \cdot CP_{125_b} = 63{,}078{,}912$$
$$CP_{120_a} = Ka \cdot La \cdot Na \cdot CP_{122_a} + Kb \cdot Lb \cdot Nb \cdot CP_{123_a} +$$
$$Kc \cdot Lc \cdot Nc \cdot Nrgb \cdot CP_{124_a} + Kd \cdot Ld \cdot Nd \cdot Nyuv \cdot CP_{120_a} = 137{,}977{,}344$$
$$\frac{CP_{120_b}}{CP_{120_a}} = 45.72\%$$

Referring to Equation 6, Nrgb indicates the number of effective channels of an RGB image (e.g., IMG_c or IMG_2). Nrgb may be 3. As expressed by Equation 6, the computation amount of the second image signal processor 120_b of FIG. 4 may be approximately 74.89% of the computational amount of the first image signal processor 120_a of FIG. 2. That is, the overall computational amount may be reduced through the architecture of the second image signal processor 120_b of FIG. 4. That is, the whole (e.g., overall) computational amount may be reduced by simplifying the BYR domain processing operation for an image and performing the simplified operation in the YUV domain.

As described above with reference to Tables 2 and 3, in the case where the first image signal processor 120_a downscales an image during the BYR domain processing, each image may have the size shown in Table 2 above, and, in the case where the resolution of the output image IMG_out is the UHD, each image may have the size shown in Table 3 above. In the case where each image has the size shown in Table 2 above, the computational amount of each of the first and second image signal processors 120_a and 120_b may be expressed by Equation 7 below. Alternatively or additionally, in the case where each image has the size shown in Table 3 above, the computational amount of each of the first and second image signal processors 120_a and 120_b may be expressed by Equation 8 below.

$$CP_{120_b} = \quad \text{[EQUATION 7]}$$
$$K1 \cdot L1 \cdot N1 \cdot CP_{123_b} + K2 \cdot L2 \cdot N2 \cdot Nrgb \cdot P_{124_b} +$$
$$K3 \cdot L3 \cdot N3 \cdot Nyuv \cdot CP_{125_b} = 63{,}078{,}912$$
$$CP_{120_a} = Ka \cdot La \cdot Na \cdot CP_{122_a} + Kb \cdot Lb \cdot Nb \cdot CP_{123_a} +$$
$$Kc \cdot Lc \cdot Nc \cdot Nrgb \cdot CP_{124_a} + Kd \cdot Ld \cdot Nd \cdot Nyuv \cdot CP_{120_a} = 84{,}229{,}632$$
$$\frac{CP_{120_b}}{CP_{120_a}} = 74.89\%$$
$$CP_{120_b} = \quad \text{[EQUATION 8]}$$
$$K1 \cdot L1 \cdot N1 \cdot CP_{123_b} + K2 \cdot L2 \cdot N2 \cdot Nrgb \cdot P_{124_b} +$$
$$K3 \cdot L3 \cdot N3 \cdot Nyuv \cdot CP_{125_b} = 197{,}448{,}192$$
$$CP_{120_a} = Ka \cdot La \cdot Na \cdot CP_{122_a} + Kb \cdot Lb \cdot Nb \cdot CP_{123_a} +$$
$$Kc \cdot Lc \cdot Nc \cdot Nrgb \cdot CP_{124_a} + Kd \cdot Ld \cdot Nd \cdot Nyuv \cdot CP_{120_a} = 157{,}635{,}072$$
$$\frac{CP_{120_b}}{CP_{120_a}} = 125.26\%$$

The variables of Equation 7 and Equation 8 are described above, and thus, additional description will be omitted to avoid redundancy. As expressed by Equation 7, in the case where the first image signal processor 120_a downscales an image during the BYR domain processing, the computational amount of the second image signal processor 120_b is approximately 74.89% of the computational amount of the first image signal processor 120_a. This computational amount may be lower than the reduction ratio of computational amount described with reference to FIG. 6. However, as described above, in the case where the first image signal processor 120_a performs downscaling during the BYR domain processing, the quality of the output image IMG_out may be degraded.

As expressed by Equation 8, in the case where the output image IMG_out is the UHD, the computational amount of the second image signal processor 120_b is 125.26% of the computational amount of the first image signal processor 120_a. That is, in the case where the resolution of the output image IMG_out is the UHD, the computational amount of the second image signal processor 120_b may become greater. However, as described with reference to Equation 3, in the case where the resolution of the output image IMG_out is the UHD, because power consumption of the second image signal processor 120_b in accessing the memory device 130 is reduced relatively greatly, the whole (e.g., overall) power consumption of the second image signal processor 120_b may be reduced compared to the first image signal processor 120_a.

As described above, the second image signal processor 120_b according to an embodiment of the present disclosure may minimize the BYR domain processing operation in which a relatively large image is processed and may increase the YUV domain processing operation in which a relatively small image is processed, and thus, the whole power consumption may be reduced. In an embodiment, the image signal processing operations that are performed by the YUV domain processing module 125_b of the second image signal processor 120_b may include at least one of various operations, which are performed during the BYR domain processing of the first image signal processor 120_a, such as a spatial de-noising operation, a temporal de-noising operation, a motion compensation operation, a tone mapping operation, a detail enhance operation, a sharpening operation.

In an embodiment, the first BYR domain processing module 122_a and the RGB domain processing module 124_a of the first image signal processor 120_a may be configured to generate frame information (e.g., FI_a or FI_b) for a subsequent operation. In this case, the number of times of an access to the memory device 130 or a computing time may increase. In contrast, the second image signal processor 120_b may include the sub-ISP module 126_b configured to generate the frame information FI. Because the frame information FI is generated by the separate sub-ISP module 126_b, the number of times of an access to the memory device 130 or a computing time may decrease. In an embodiment, the sub-ISP module 126_b may provide advantages to a multi-camera structure, which will be described in detail with reference to embodiments of FIGS. 12 to 15.

Figure 6:
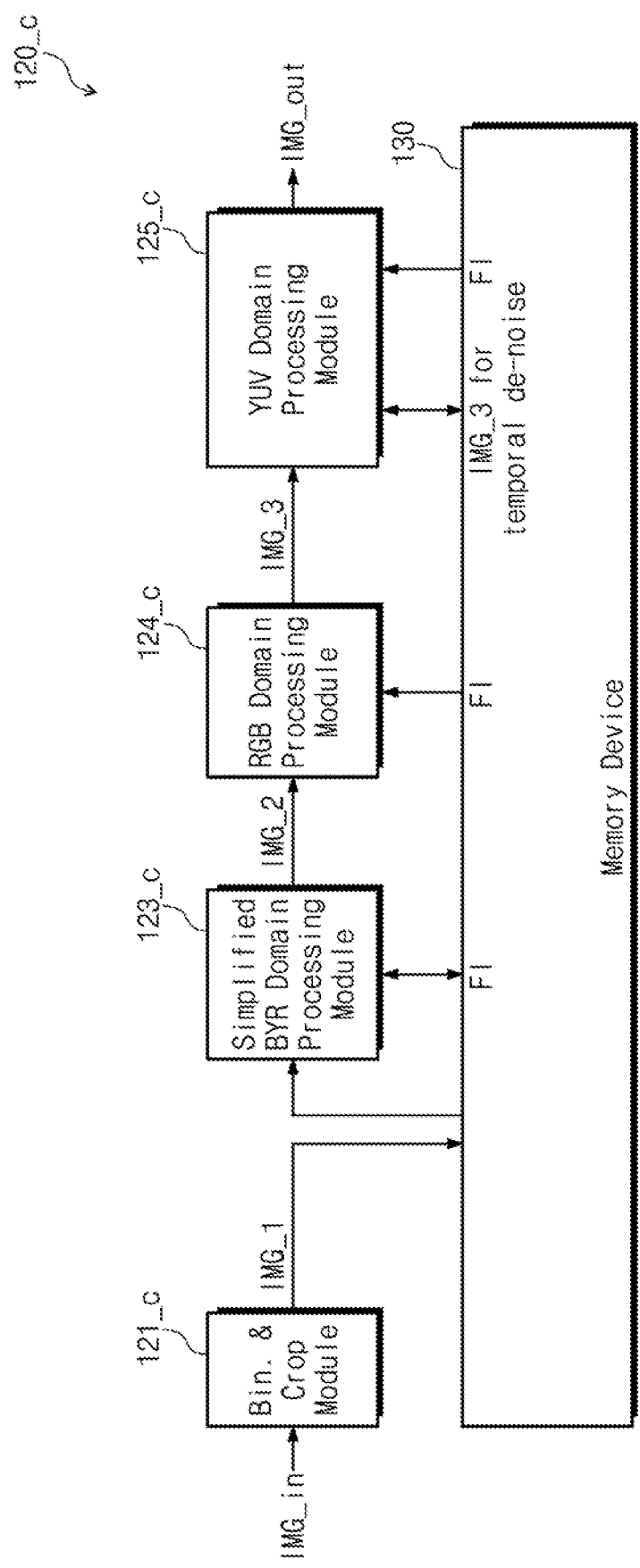
FIG. 6 is a block diagram illustrating an image signal processor of FIG. 1.

FIG. 6 is a block diagram illustrating an image signal processor of FIG. 1. Referring to FIGS. 1 and 6, a third image signal processor 120_c may include a binning and crop module 121_c, a simplified BYR domain processing module 123_c, an RGB domain processing module 124_c, and a YUV domain processing module 125_c. Operations of the binning and crop module 121_c, the simplified BYR domain processing module 123_c, the RGB domain processing module 124_c, and the YUV domain processing module 125_c may be similar to those described with reference to FIG. 4, and thus, additional description will be omitted to avoid redundancy.

In an embodiment, unlike the second image signal processor 120_b of FIG. 4, the third image signal processor 120_c of FIG. 6 may not include a sub-ISP module configured to generate the frame information FI. In this case, the simplified BYR domain processing module 123_c may generate the frame information FI based on the first image IMG_1, and the generated frame information FI may be stored in the memory device 130.

According to the embodiment of FIG. 6, even though the sub-ISP module configured to generate the frame information FI does not exist, because the BYR domain processing for an image of a relatively large size is minimized, power consumption may be reduced.

Figure 7:
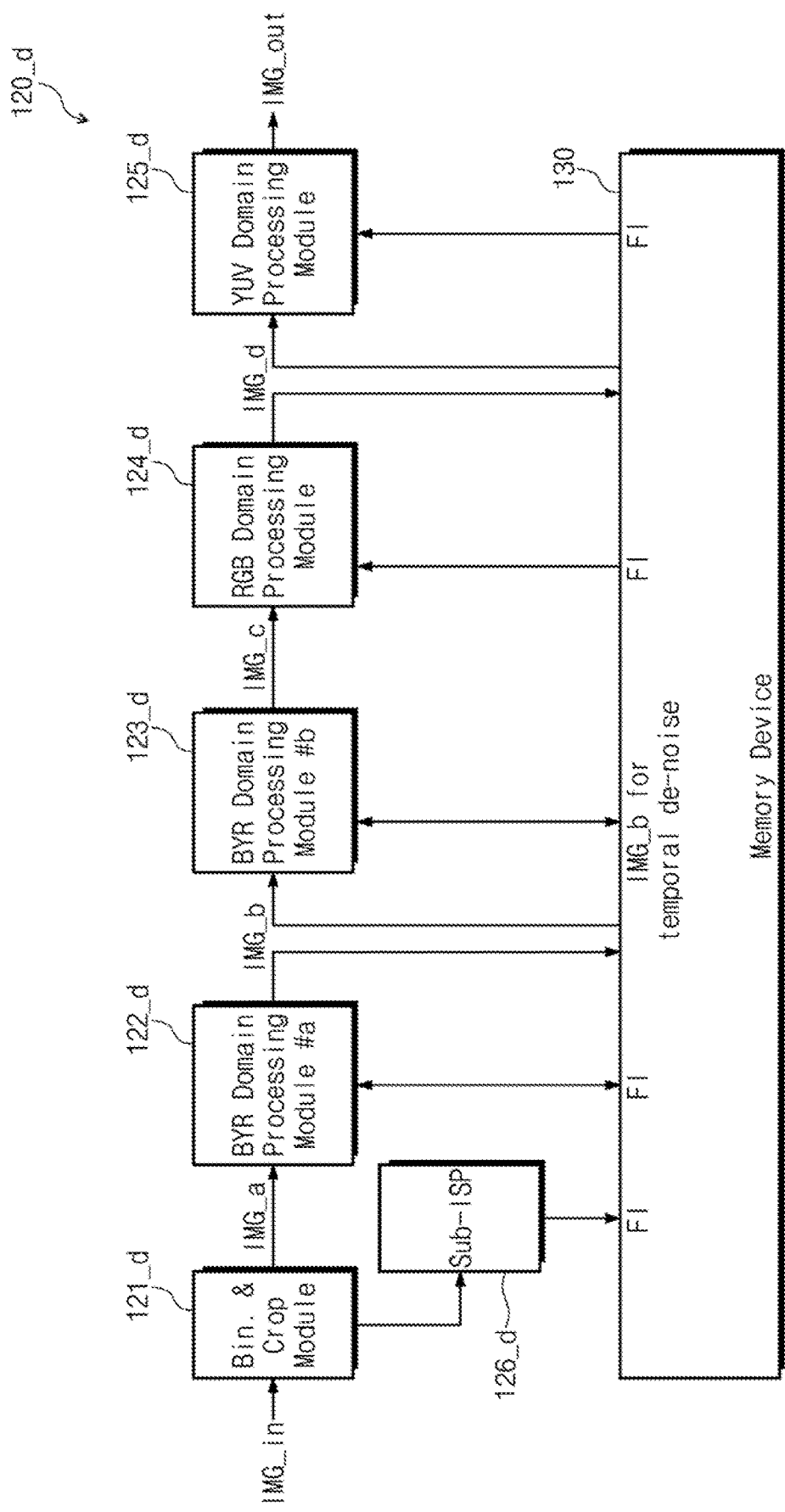
FIG. 7 is a block diagram illustrating an image signal processor of FIG. 1.

FIG. 7 is a block diagram illustrating an image signal processor of FIG. 1. Referring to FIGS. 1 and 7, a fourth image signal processor 120_d may include a binning and crop module 121_d, a first BYR domain processing module 122_d, a second BYR domain processing module 123_d, an RGB domain processing module 124_d, a YUV domain processing module 125_d, and an sub-ISP module 126_d. Operations of the binning and crop module 121_d, the first BYR domain processing module 122_d, the second BYR domain processing module 123_d, the RGB domain processing module 124_d, and the YUV domain processing module 125_d may be similar to those described with reference to FIG. 2, and thus, additional description will be omitted to avoid redundancy.

In an embodiment, unlike the first image signal processor 120_a of FIG. 2, the fourth image signal processor 120_d of FIG. 7 may generate the frame information FI, and the frame information FI may be stored in the memory device 130. That is, the first BYR domain processing module 122_d and the RGB domain processing module 124_d of FIG. 7 may not generate separate frame information.

According to the embodiment of FIG. 7, compared to the first image signal processor 120_a, each module may not change in operation and order; however, because the sub-ISP module 126_d generating the frame information FI is provided, the number of times of an access to the memory device 130 and a computing time, which are necessary to generate the frame information FI, may be reduced.

Figure 8:
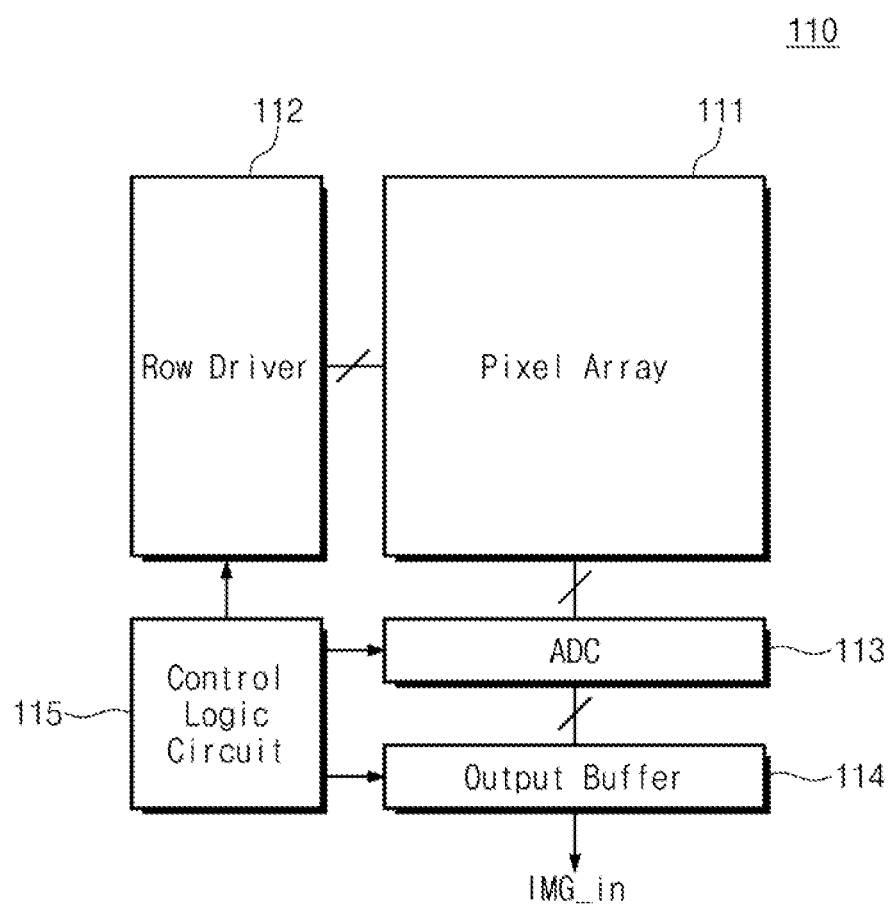
FIG. 8 is a block diagram illustrating an image sensor device of FIG. 1.

FIG. 8 is a block diagram illustrating an image sensor device of FIG. 1. Referring to FIGS. 1 and 8, the image sensor device 110 may include a pixel array 111, a row driver 112, an analog-to-digital converter 113, an output buffer 114, and a control logic circuit 115.

The pixel array 111 may include a plurality of pixels. The plurality of pixels may be arranged in a row direction and a column direction. Each pixel of the pixel array 111 may output a pixel signal PIXOUT depending on the intensity or the amount of light received from the outside. In this case, the pixel signal PIXOUT may be an analog signal that corresponds to the intensity or the amount of light received from the outside.

The row driver 112 may provide row control signals (e.g., RST, TX, and SEL) to the pixel array 111. The plurality of pixels of the pixel array 111 may operate in response to the row control signals provided from the row driver 112. The analog-to-digital converter 113 may receive pixel signals from the plurality of pixels of the pixel array 111 and may convert and output the received pixel signals into digital signals. The output buffer 114 may store the digital signals output from the analog-to-digital converter 113 and may output the stored digital signals as the input image IMG_in. The input image IMG_in may be provided to the image signal processor 120, and the image signal processor 120 may generate the output image IMG_out by performing image signal processing on the input image IMG_in based on the above embodiments. The control logic circuit 115 may control an overall operation of the image sensor device 110.

The schematic configuration of the image sensor device 110 is described with reference to FIG. 8, but the present disclosure is not limited thereto. It may be understood that the image sensor device 110 may be implemented in various structures capable of being comprehended by one skilled in the art.

In an embodiment, the pixel array 111 may include the color filter array (CFA). The color filter array may be implemented in a BYR pattern, a tetra pattern, a nona pattern, a hexa pattern, a deca pattern, or various color patterns. In an embodiment, the input image IMG_in may have a color pattern that is the same as (e.g., matches) the color pattern of the color filter array of the pixel array 111.

Figure 9:
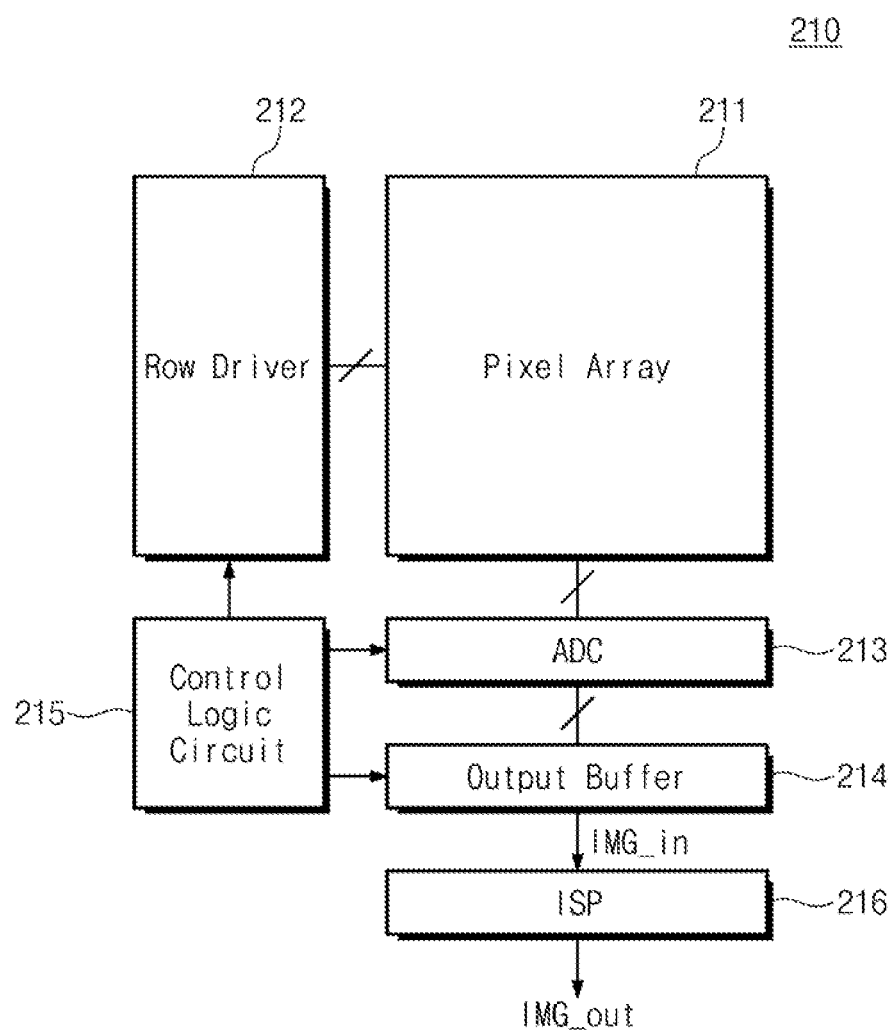
FIG. 9 is a block diagram illustrating an image sensor device according to an embodiment of the present disclosure.

FIG. 9 is a block diagram illustrating an image sensor device according to an embodiment of the present disclosure. Referring to FIGS. 1 and 9, an image sensor device 210 may include a pixel array 211, a row driver 212, an analog-to-digital converter 213, an output buffer 214, a control logic circuit 215, and an image signal processor 216. The pixel array 211, the row driver 212, the analog-to-digital converter 213, the output buffer 214, and the control logic circuit 215 are similar to those described with reference to FIG. 8, and thus, additional description will be omitted to avoid redundancy.

In the embodiments described with reference to FIGS. 1 to 8, the image sensor device 110 and the image signal processor 120 are implemented with separate components or separate hardware, respectively. In contrast, in the embodiment of FIG. 9, the image signal processor 216 may be included in the image sensor device 210. That is, instead of outputting the input image IMG_in of the same color pattern as (e.g., matching) the color filter array included in the pixel array 211, the image sensor device 210 may generate and output the output image IMG_out by performing various image signal processing operations on the input image IMG_in. In this case, the output image IMG_out may have a format that is available by an external device (e.g., a display device).

Figure 10:
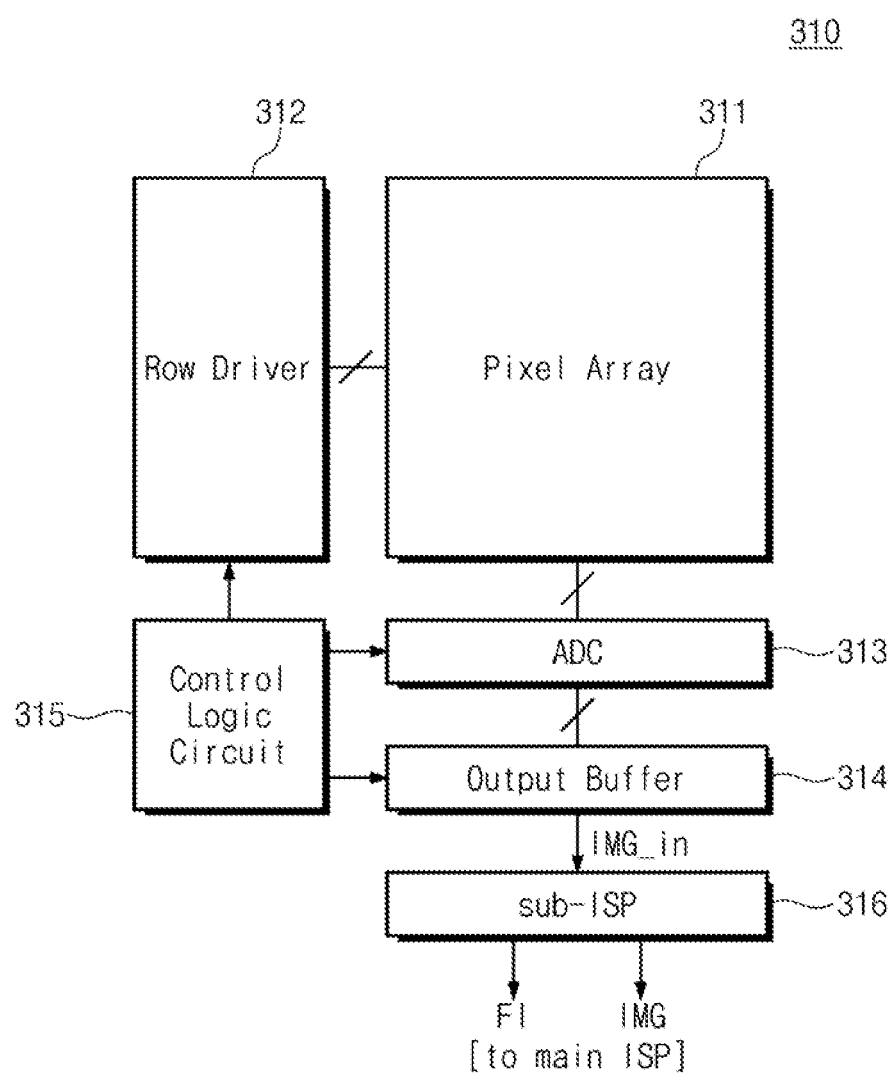
FIG. 10 is a block diagram illustrating an image sensor device according to an embodiment of the present disclosure.

FIG. 10 is a block diagram illustrating an image sensor device according to an embodiment of the present disclosure. Referring to FIG. 10, an image sensor device 310 may include a pixel array 311, a row driver 312, an analog-to-digital converter 313, an output buffer 314, a control logic circuit 315, and a sub-image signal processor 316. The pixel array 311, the row driver 312, the analog-to-digital converter 313, the output buffer 314, and the control logic circuit 315 are similar to those described with reference to FIG. 8, and thus, additional description will be omitted to avoid redundancy.

The sub-image signal processor 316 may generate the frame information FI by using the input image IMG_in output from the output buffer 314. For example, the sub-image signal processor 316 may perform the same function as the above sub-ISP module 126_c or 126_d. The frame information FI generated by the sub-image signal processor 316 may be provided to a memory device (e.g., 130), and the input image IMG_in may be provided to a main image signal processor (e.g., 120_a, 120_b, 120_c, or 120_d). The main image signal processor may perform various signal processing operations on the input image IMG_in depending on the above embodiments and thus may generate the output image IMG_out.

Figure 11:
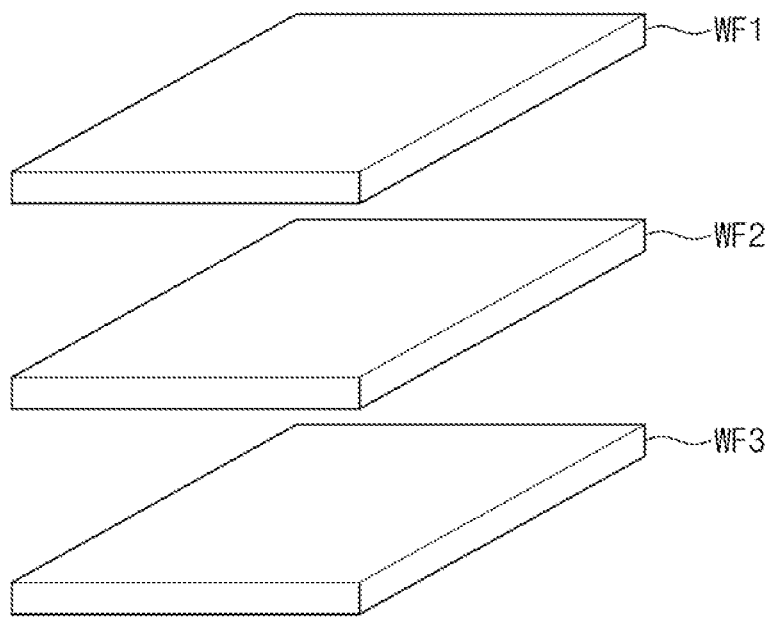
FIG. 11 is a diagram for describing a stacked structure of an image sensor device according to an embodiment of the present disclosure.

FIG. 11 is a diagram for describing a stacked structure of an image sensor device according to an embodiment of the present disclosure. Referring to FIG. 11, an image sensor device 410 may include a first chip WF1, a second chip WF2, and a third chip WF3. Each of the first to third chips WF1 to WF3 may be formed in a separate semiconductor wafer. The first chip WF1 may be stacked on the second chip WF2, and the second chip WF2 may be stacked on the third chip WF3. The first to third chips WF1 to WF3 may be electrically connected with each other through various bonding manners, such as a bonding manner and a through silicon via (TSV) manner.

The first to third chips WF1 to WF3 may include various components (e.g., a pixel array, a row driver, an analog-to-digital converter, an output buffer, and a control logic circuit) of the image sensor device 410. For example, the first chip WF1 may include a pixel array and a row driver, the second chip WF2 may include an analog-to-digital converter and a control logic circuit, and the third chip WF3 may include an output buffer. However, the present disclosure is not limited thereto. Various components of the image sensor device 410 may be distributed and disposed into the first to third chips WF1 to WF3 in various forms depending on the way to implement.

In an embodiment, as described above, in the case where the image sensor device 410 includes the ISP 216 or the sub-ISP 316, the ISP 216 or the sub-ISP 316 may be included in one of the first to third chips WF1 to WF3.

Figure 12:
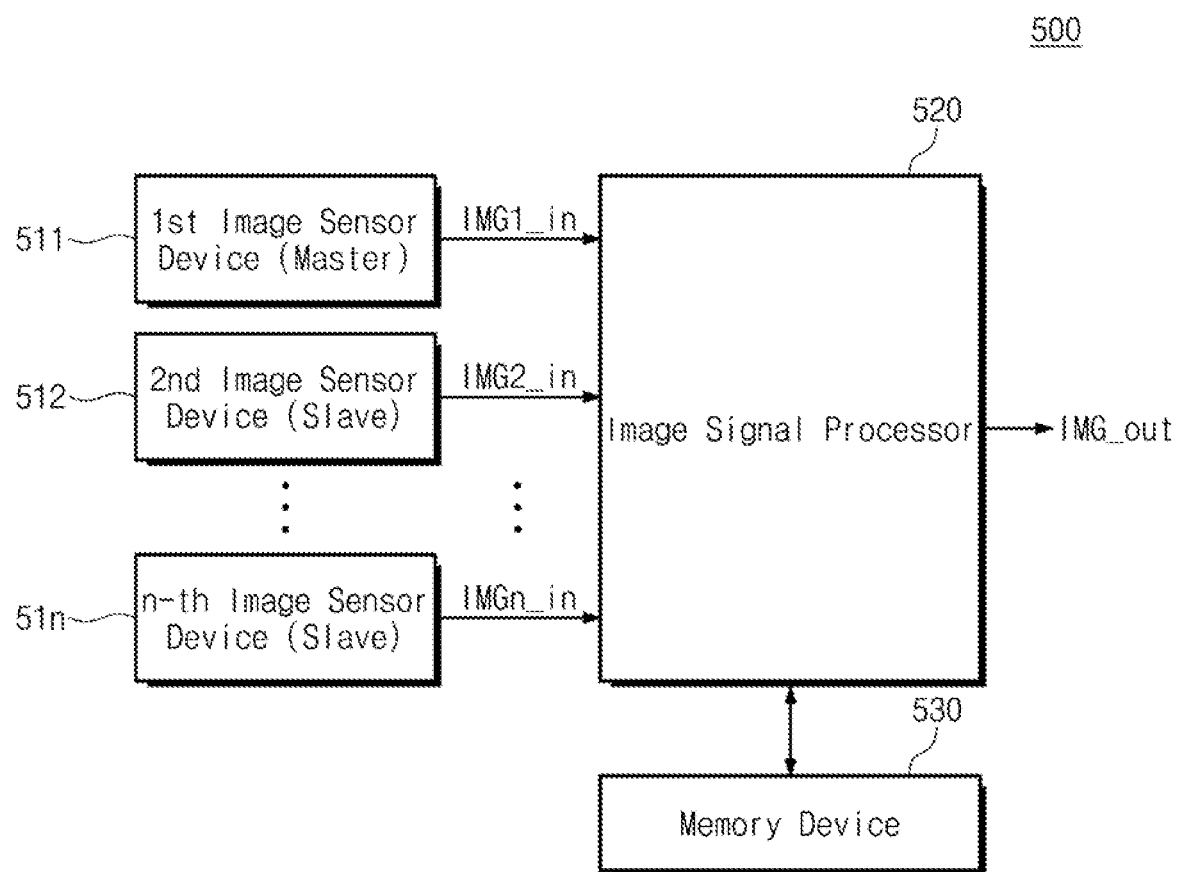
FIG. 12 is a block diagram illustrating an image system according to an embodiment of the present disclosure.
Figure 13:
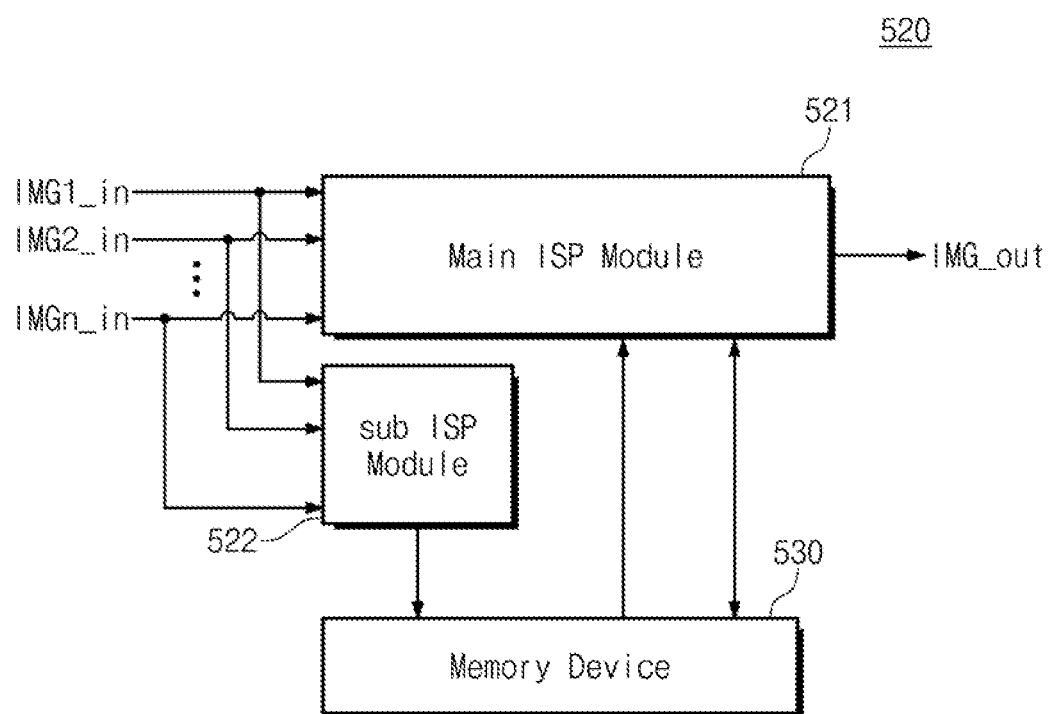
FIG. 13 is a block diagram for describing an image signal processor of FIG. 12.

FIG. 12 is a block diagram illustrating an image system according to an embodiment of the present disclosure. FIG. 13 is a block diagram for describing an image signal processor of FIG. 12. Referring to FIGS. 12 and 13, an image system 500 may include a plurality of image sensor devices 511 to 51n, an image signal processor 520, and a memory device 530. The plurality of image sensor devices 511 to 51n may implement a multi-camera. For example, the plurality of image sensor devices 511 to 51n may have different fields of view or different focal lengths and may be configured to capture different foregrounds. The plurality of image sensor devices 511 to 51n may respectively output a plurality of input images IMG1_in to IMGn_in including information of the captured foregrounds.

The image signal processor 520 may receive the plurality of input images IMG1_in to IMGn_in from the plurality of image sensor devices 511 to 51n and may generate the output image IMG_out based on the received input images IMG1_in to IMGn_in. For example, the first image sensor device 511 of the plurality of image sensor devices 511 to 51n may be a master device or a master camera, and the remaining image sensor devices 512 to 51n may be slave devices or slave cameras. The output image IMG_out may be generated based on an input image generated from the master device or the master camera, and an input image generated from the slave device or the slave camera may be used to enhance the quality of the output image IMG_out. In this case, the image signal processor 520 may generate the output image IMG_out based on the first input image IMG1_in received from the first image sensor device 511 being the master camera. The image signal processor 520 may generate the frame information FI based on the second to n-th input images IMG2_in to IMGn_in respectively received from the remaining image sensor devices 512 to 51n being the slave devices or the slave cameras.

For example, as illustrated in FIG. 13, the image signal processor 520 may include a main ISP module 521 and a sub-ISP module 522. In an embodiment, the main ISP module 521 may include signal processing modules such as a binning and crop module, a first BYR domain processing module, a second BYR domain processing module, a simplified BYR domain processing module, an RGB domain processing module, and a YUV domain processing module described with reference to FIGS. 1 to 7.

The main ISP module 521 may generate the output image IMG_out based on an input image (e.g., IMG1_in) corresponding to the master device or master camera from among the plurality of input images IMG1_in to IMGn_in received from the plurality of image sensor devices 511 to 51n. In an embodiment, the binning and crop module included in the main ISP module 521 may select the input image (e.g., IMG1_in) corresponding to the master device or master camera from among the plurality of input images IMG1_in to IMGn_in received from the plurality of image sensor devices 511 to 51n and may perform a binning and crop operation on the selected input image.

The sub-ISP module 522 may generate the frame information FI based on the plurality of input images IMG1_in to IMGn_in. For example, the sub-ISP module 522 may generate the frame information FI based on the input image (e.g., IMG1_in) corresponding to the master device or master camera from among the plurality of input images IMG1_in to IMGn_in. Alternatively or additionally, the sub-ISP module 522 may generate the frame information FI based on input images (e.g., IMG2_in to IMGn_in) corresponding to the slave devices or slave cameras from among the plurality of input images IMG1_in to IMGn_in. The frame information FI thus generated may be stored in the memory device 530. In an embodiment, the main ISP module 521 may enhance the quality of the output image IMG_out by using the frame information FI stored in the memory device 530.

The memory device 530 may be configured to store various data, various information, or various image data that are used by the image signal processor 520. In an embodiment, the memory device 530 may be a high-speed memory device such as a dynamic random access memory (DRAM).

As described above, the image signal processor 520 may effectively operate only the sub-ISP module 522 with respect to the remaining image sensor devices 512 to 51n being the slave devices or slave cameras, and thus, the whole power consumption may be reduced. For example, the first image sensor device 511 may maintain an enable mode for the purpose of the generation of the output image IMG_out, and the remaining image sensor devices 512 to 51n being the slave devices or slave cameras may be maintained in a standby mode to minimize a latency with regard to cameras switching. In this case, the whole (e.g., overall) power consumption may be reduced by effectively operating only the sub-ISP module 522 with respect to the second to n-th image sensor devices 512 to 51n being the slave devices. Additionally, in the case of switching cameras (i.e., in the case of changing the master camera), the camera switching may be performed relatively fast because the frame information FI about the second to n-th image sensor devices 512 to 51n being the slave devices are already in a state of being obtained.

In the embodiment of FIG. 12, the description is given as one image signal processor 520 processes the plurality of input images IMG1_in to IMGn_in from the plurality of image sensor devices 511 to 51n, but the present disclosure is not limited thereto. Image signal processors that are physically or logically separated from each other may be provided to respectively correspond to the plurality of image sensor devices 511 to 51n, and each image sensor device may determine whether to operate a sub-ISP module or a main ISP module depending on attributes of the corresponding image sensor device (i.e., depending on whether the corresponding image sensor device is a master device or a slave device).

Figure 14:
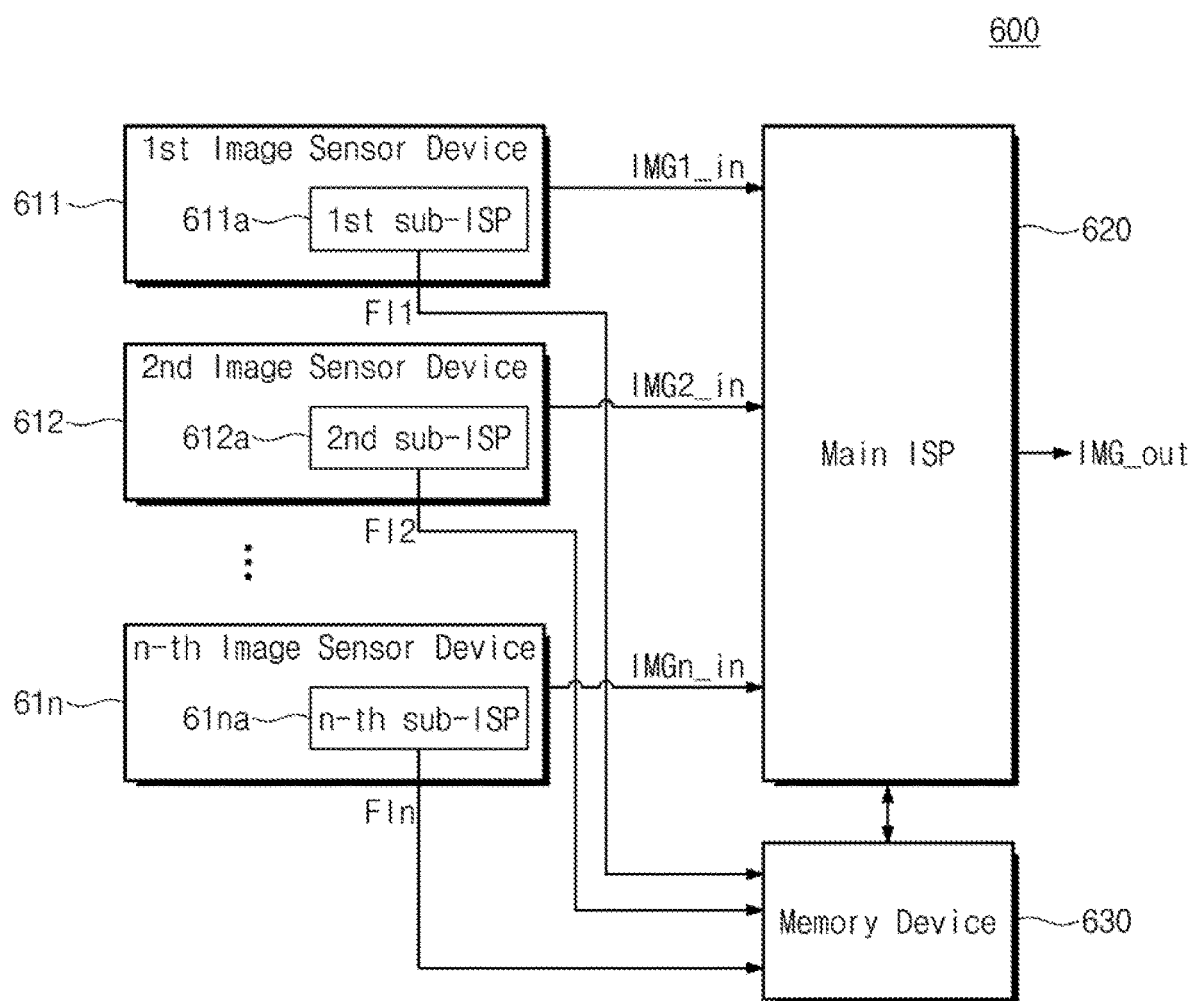
FIG. 14 is a block diagram illustrating an image system according to an embodiment of the present disclosure.

FIG. 14 is a block diagram illustrating an image system according to an embodiment of the present disclosure. Referring to FIG. 14, an image system 600 may include a plurality of image sensor devices 611 to 61n, a main ISP 620, and a memory device 630. The plurality of image sensor devices 611 to 61n may implement a multi-camera. For example, the plurality of image sensor devices 611 to 61n may have different fields of view or different focal lengths and may be configured to capture different foregrounds. The plurality of image sensor devices 611 to 61n may respectively output the plurality of input images IMG1_in to IMGn_in including information of the captured foregrounds.

The plurality of image sensor devices 611 to 61n may include sub-ISPs 611a to 61na, respectively. The sub-ISPs 611a to 61na may be configured to generate frame information FI1 to FIn about input images respectively generated by the corresponding image sensor devices 611 to 61n. For example, the first image sensor device 611 may include the first sub-ISP 611a, and the first sub-ISP 611a may generate the first frame information FI1 about the first input image IMG1_in generated by the first image sensor device 611. The second image sensor device 612 may include the second sub-ISP 612a, and the second sub-ISP 612a may generate the second frame information FI2 about the second input image IMG2_in generated by the second image sensor device 612. The n-th image sensor device 61n may include the n-th sub-ISP 61na, and the n-th sub-ISP 61na may generate the n-th frame information FIn about the n-th input image IMGn_in generated by the n-th image sensor device 61n. The frame information FI1 to FIn thus generated may be stored in the memory device 630.

The main ISP 620 may generate the output image IMG_out by performing various image signal processing operations on at least one of the plurality of input images IMG1_in to IMGn_in by using the plurality of frame information FI1 to FIn stored in the memory device 630.

Figure 15:
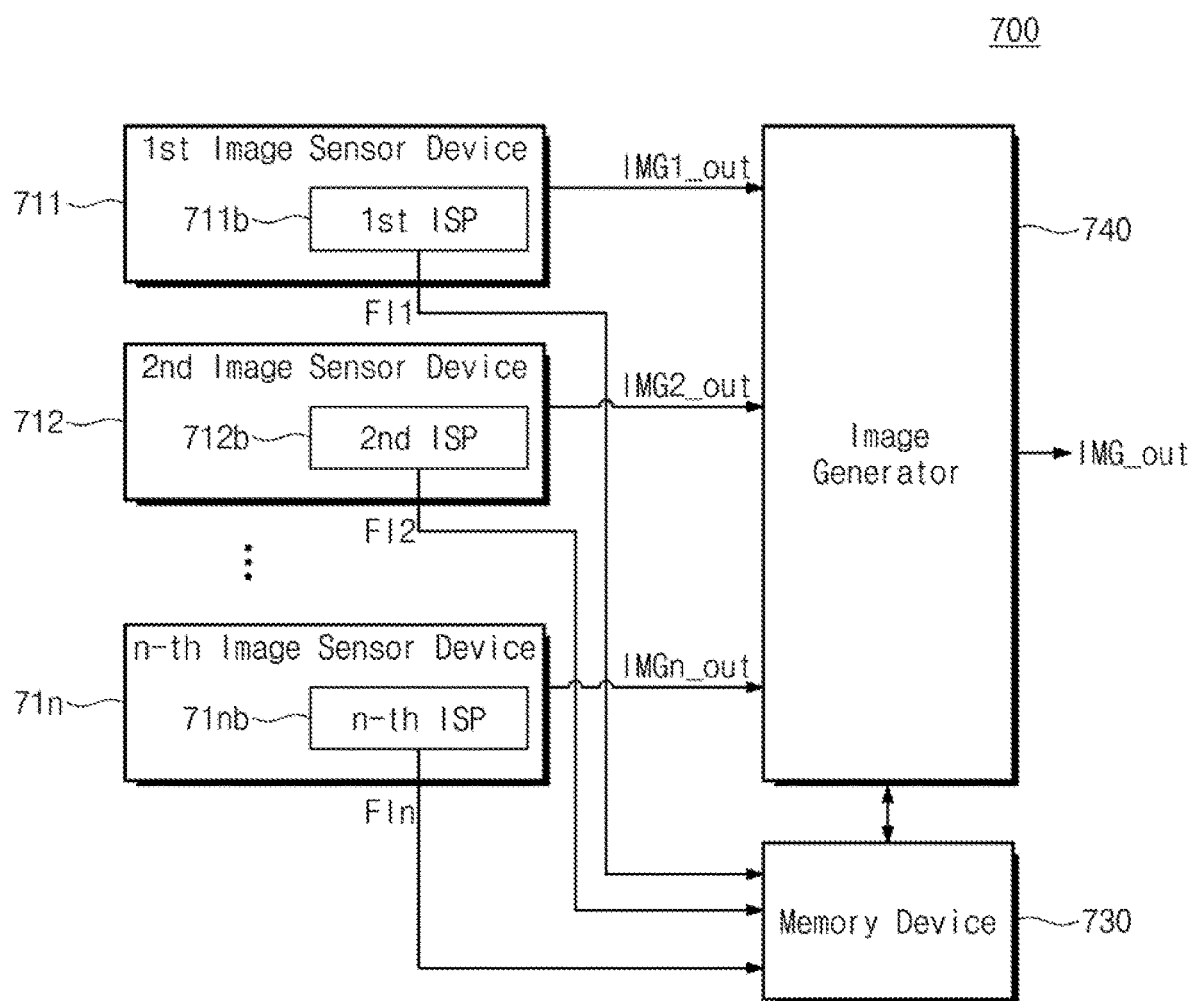
FIG. 15 is a block diagram illustrating an image system according to an embodiment of the present disclosure.

FIG. 15 is a block diagram illustrating an image system according to an embodiment of the present disclosure. Referring to FIG. 15, an image system 700 may include a plurality of image sensor devices 711 to 71n, a memory device 730, and an image generator 740. The plurality of image sensor devices 711 to 71n may implement a multi-camera as described above, and thus, additional description will be omitted to avoid redundancy.

The plurality of image sensor devices 711 to 71n may include ISPs 711b to 71nb, respectively. The ISPs 711b to 71nb may generate the frame information FI1 to FIn about input images respectively generated by the corresponding image sensor devices. For example, the first image sensor device 711 may include the first ISP 711b, and the first ISP 711b may generate the first frame information FI1 about a first input image generated by the first image sensor device 711. The second image sensor device 712 may include the second ISP 712b, and the second ISP 712b may generate the second frame information FI2 about a second input image generated by the second image sensor device 712. The n-th image sensor device 71n may include the n-th ISP 71nb, and the n-th ISP 71nb may generate the n-th frame information FIn about an n-th input image generated by the n-th image sensor device 71n. The frame information FI1 to FIn thus generated may be stored in the memory device 730.

The ISPs 711b to 71nb may respectively generate output images IMG1_out to IMGn_out by performing various image signal processing operations on input images generated by the corresponding image sensor devices 711 to 71n. For example, the first ISP 711b of the first image sensor device 711 may generate the first output image IMG1_out by performing various image signal processing operations on the first image by using the frame information FI1 to FIn stored in the memory device 730. The second ISP 712b of the second image sensor device 712 may generate the second output image IMG2_out by performing various image signal processing operations on the second image by using the frame information FI1 to FIn stored in the memory device 730. The n-th ISP 71nb of the n-th image sensor device 71n may generate the n-th output image IMGn_out by performing various image signal processing operations on the n-th image by using the frame information FI1 to FIn stored in the memory device 730.

In an embodiment, each of the ISPs 711*b* to 71*nb* included in the plurality of image sensor devices 711 to 71*n* may be the image signal processor described with reference to FIG. 4. In an embodiment, an ISP included in an image sensor device being a master device or master camera from among the plurality of image sensor devices 711 to 71*n* may generate both an output image and frame information, and an ISP included in an image sensor device being a slave device or slave camera may skip the generation of the output image (i.e., a main ISP of ISPs being disabled).

The image generator 740 may receive the plurality of output images IMG1_out to IMGn_out from the plurality of image sensor devices 711 to 71*n*. The image generator 740 may combine the plurality of output images IMG1_out to IMGn_out to generate the final output image IMG_out.

Figure 16:
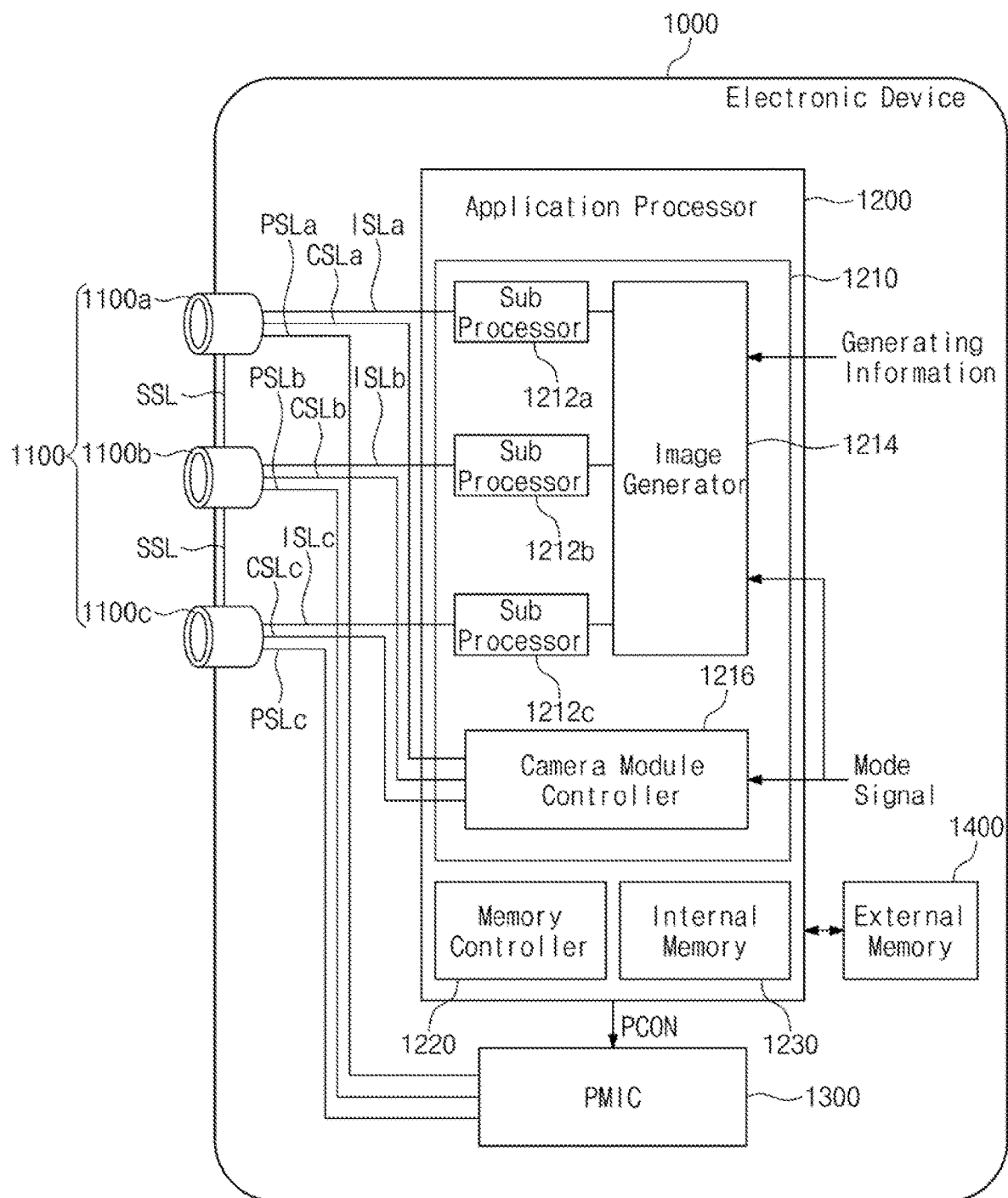
FIG. 16 is a block diagram of an electronic device including a multi-camera module.
Figure 17:
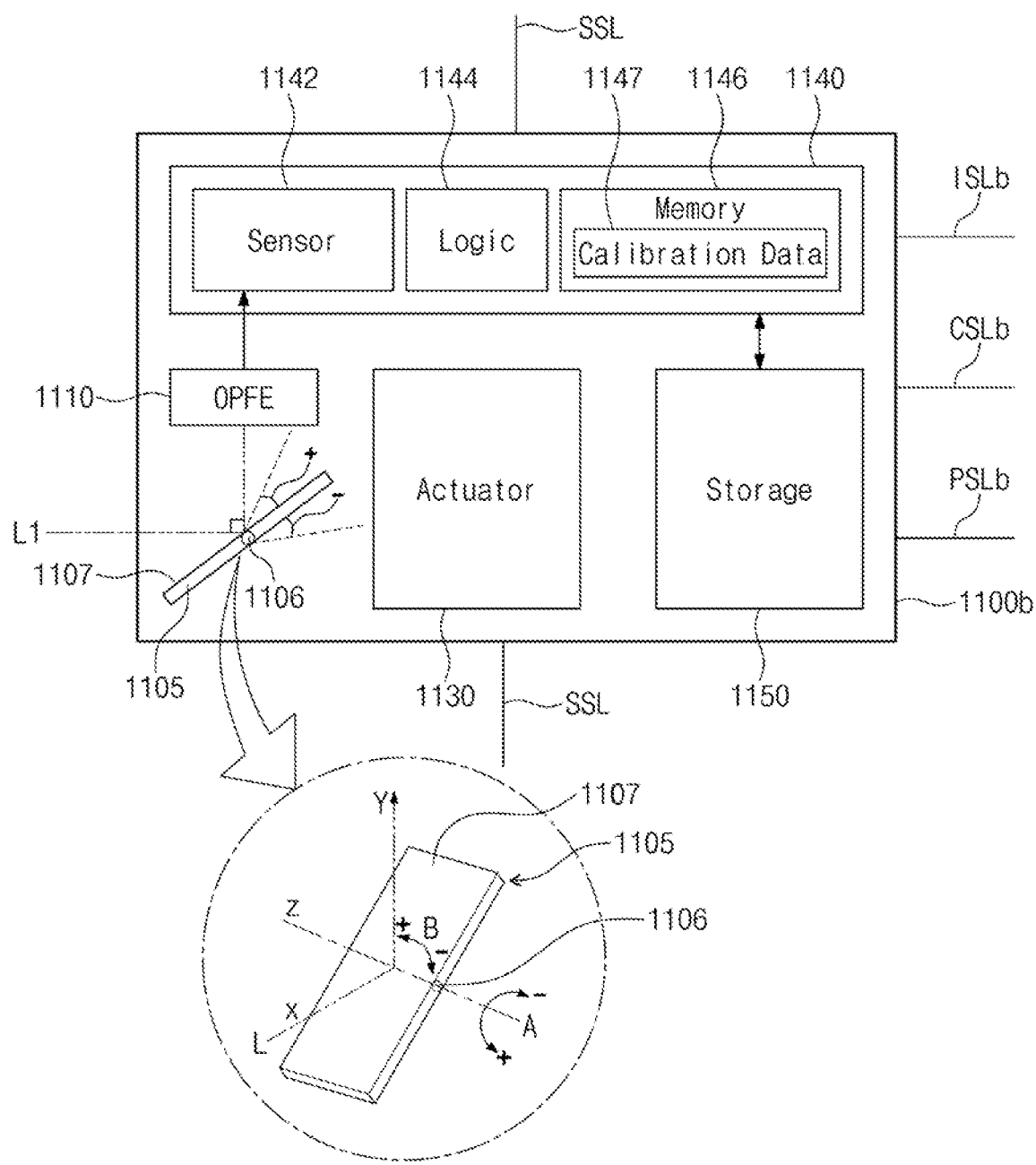
FIG. 17 is a detailed block diagram of a camera module of FIG. 16.

FIG. 16 is a block diagram of an electronic device including a multi-camera module. FIG. 17 is a block diagram illustrating a camera module of FIG. 16 in detail.

Referring to FIG. 16, an electronic device 1000 may include a camera module group 1100, an application processor 1200, a PMIC 1300, and an external memory 1400.

The camera module group 1100 may include a plurality of camera modules 1100*a*, 1100*b*, and 1100*c*. An electronic device including three camera modules 1100*a*, 1100*b*, and 1100*c* is illustrated in FIG. 16, but the present disclosure is not limited thereto. In some embodiments, the camera module group 1100 may be modified to include only two camera modules. Alternatively or additionally, in some embodiments, the camera module group 1100 may be modified to include "n" camera modules (n being a natural number of 4 or more).

Below, a detailed configuration of the camera module 1100*b* will be more fully described with reference to FIG. 17, but the following description may be equally applied to the remaining camera modules 1100*a* and 1100*c*.

Referring to FIG. 17, the camera module 1100*b* may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some embodiments, the prism 1105 may change a path of the light "L" incident in a first direction (X) to a second direction (Y) perpendicular to the first direction (X). Alternatively or additionally, the prism 1105 may change the path of the light "L" incident in the first direction (X) to the second direction (Y) perpendicular to the first (X-axis) direction by rotating the reflecting plane 1107 of the light reflecting material in direction "A" about a central axis 1106 or rotating the central axis 1106 in direction "B". In this case, the OPFE 1110 may move in a third direction (Z) perpendicular to the first direction (X) and the second direction (Y).

In some embodiments, as illustrated in FIG. 17, a maximum rotation angle of the prism 1105 in direction "A" may be equal to or smaller than 15 degrees in a positive A direction and may be greater than 15 degrees in a negative A direction, but the present disclosure is not limited thereto.

In some embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., Z direction) parallel to a direction in which the central axis 1106 extends.

The OPFE 1110 may include optical lenses composed of "m" groups (m being a natural number), for example. Here, "m" lens may move in the second direction (Y) to change an optical zoom ratio of the camera module 1100*b*. For example, when a default optical zoom ratio of the camera module 1100*b* is "Z", the optical zoom ratio of the camera module 1100*b* may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100*b*. For example, the control logic 1144 may control an operation of the camera module 1100*b* based on a control signal provided through a control signal line CSLb.

The memory 1146 may store information, which is necessary for an operation of the camera module 1100*b*, such as calibration data 1147. The calibration data 1147 may include information necessary for the camera module 1100*b* to generate image data by using the light "L" provided from the outside. The calibration data 1147 may include, for example, information about the degree of rotation described above, information about a focal length, information about an optical axis, etc. In the case where the camera module 1100*b* is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some embodiments, the storage 1150 may be implemented with an electrically erasable programmable read only memory (EEPROM), but the present disclosure is not limited thereto.

Referring together to FIGS. 16 and 17, in some embodiments, each of the plurality of camera modules 1100*a*, 1100*b*, and 1100*c* may include the actuator 1130. As such, the same calibration data 1147 or different calibration data 1147 may be included in the plurality of camera modules 1100*a*, 1100*b*, and 1100*c* depending on operations of the actuators 1130 therein.

In some embodiments, one camera module (e.g., 1100*b*) among the plurality of camera modules 1100*a*, 1100*b*, and 1100*c* may be a folded lens shape of camera module in which the prism 1105 and the OPFE 1110 described above are included, and the remaining camera modules (e.g., 1100*a* and 1100*c*) may be a vertical shape of camera module in which the prism 1105 and the OPFE 1110 described above are not included; however, the present disclosure is not limited thereto.

In some embodiments, one camera module (e.g., 1100*c*) among the plurality of camera modules 1100*a*, 1100*b*, and

1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, but the present disclosure is not limited thereto.

Alternatively or additionally, in some embodiments, fields of view of the plurality of camera modules 1100a, 1100b, and 1100c may be different. In this case, the plurality of camera modules 1100a, 1100b, and 1100c may include different optical lens, not limited thereto.

In some embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 16, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present disclosure is not limited thereto.

Meanwhile, in some embodiments, one sub image processor may be disposed to correspond to a plurality of camera modules. For example, the sub image processor 1212a and the sub image processor 1212c may be integrally implemented, not separated from each other as illustrated in FIG. 12; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In detail, the image generator 1214 may generate the output image by merging at least a portion of the image data respectively generated from the camera modules 1100a, 1100b, and 1100c having different fields of view, depending on the image generating information Generating Information or the mode signal. Alternatively or additionally, the image generator 1214 may generate the output image by selecting one of the image data respectively generated from the camera modules 1100a, 1100b, and 1100c having different fields of view, depending on the image generating information Generating Information or the mode signal.

In some embodiments, the image generating information (e.g., "Generating Information") may include a zoom signal or a zoom factor. Alternatively or additionally, in some embodiments, the mode signal may be, for example, a signal based on a mode selected from a user.

In the case where the image generating information Generating Information is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and a way to process image data may be modified without limitation if necessary.

In some embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

In an embodiment, the plurality of sub image processors 1212a, 1212b, and 1212c and the image generator 1214 may be an image signal processor described with reference to FIGS. 1 to 15, or may be included thereto.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Alternatively or additionally, a level of a power may be dynamically changed.

Figure 18:
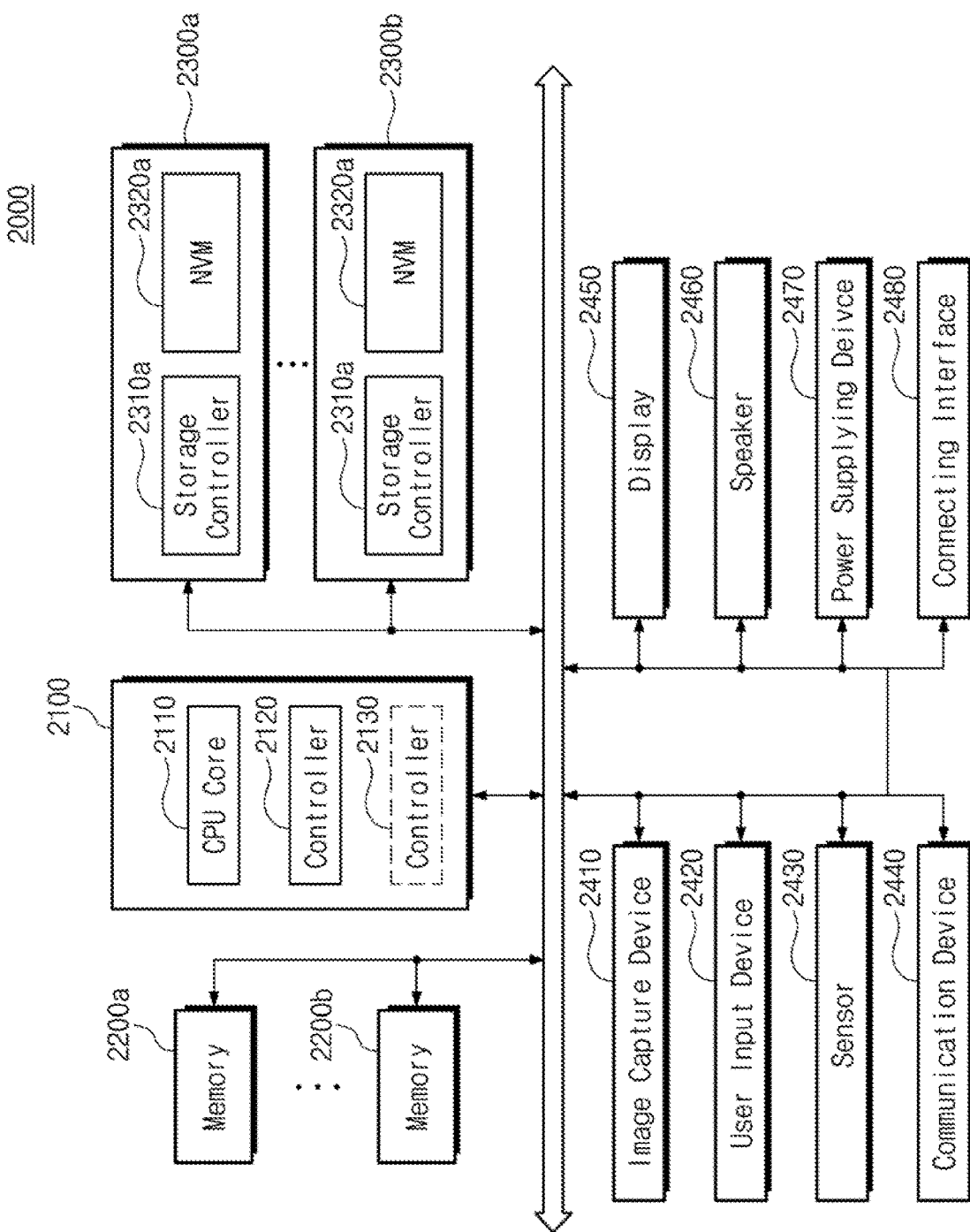
FIG. 18 is a diagram illustrating a system to which an image device according to an embodiment of the present disclosure is applied.

FIG. 18 is a diagram of a system 2000 to which a storage device is applied, according to an embodiment. The system 2000 of FIG. 18 may basically be a mobile system, such as a portable communication terminal (e.g., a mobile phone), a smartphone, a tablet personal computer (PC), a wearable device, a healthcare device, or an Internet of things (IOT) device. However, the system 2000 of FIG. 18 is not necessarily limited to the mobile system and may be a PC, a laptop computer, a server, a media player, or an automotive device (e.g., a navigation device).

Referring to FIG. 18, the system 2000 may include a main processor 2100, memories (e.g., 2200a and 2200b), and storage devices (e.g., 2300a and 2300b). In addition, the system 2000 may include at least one of an image capturing device 2410, a user input device 2420, a sensor 2430, a communication device 2440, a display 2450, a speaker 2460, a power supplying device 2470, and a connecting interface 2480.

The main processor 2100 may control all operations of the system 2000, more specifically, operations of other components included in the system 2000. The main processor 2100 may be implemented as a general-purpose processor, a dedicated processor, or an application processor.

The main processor 2100 may include at least one CPU core 2110 and further include a controller 2120 configured to control the memories 2200a and 2200b and/or the storage devices 2300a and 2300b. In some embodiments, the main processor 2100 may further include an accelerator 2130, which is a dedicated circuit for a high-speed data operation, such as an artificial intelligence (AI) data operation. The accelerator 2130 may include a graphics processing unit (GPU), a neural processing unit (NPU) and/or a data processing unit (DPU) and be implemented as a chip that is physically separate from the other components of the main processor 2100.

The memories 2200a and 2200b may be used as main memory devices of the system 2000. Although each of the memories 2200a and 2200b may include a volatile memory, such as static random access memory (SRAM) and/or dynamic RAM (DRAM), each of the memories 2200a and 2200b may include non-volatile memory, such as a flash memory, phase-change RAM (PRAM) and/or resistive RAM (RRAM). The memories 2200a and 2200b may be implemented in the same package as the main processor 2100.

The storage devices 2300a and 2300b may serve as non-volatile storage devices configured to store data regardless of whether power is supplied thereto, and have larger storage capacity than the memories 2200a and 2200b. The storage devices 2300a and 2300b may respectively include storage controllers (STRG CTRL) 2310a and 2310b and NVM (Non-Volatile Memory)s 2320a and 2320b configured to store data via the control of the storage controllers 2310a and 2310b. Although the NVMs 2320a and 2320b may include flash memories having a two-dimensional (2D) structure or a three-dimensional (3D) V-NAND structure, the NVMs 2320a and 2320b may include other types of NVMs, such as PRAM and/or RRAM.

The storage devices 2300a and 2300b may be physically separated from the main processor 2100 and included in the system 2000 or implemented in the same package as the main processor 2100. In addition, the storage devices 2300a and 2300b may have types of solid-state devices (SSDs) or memory cards and be removably combined with other components of the system 200 through an interface, such as the connecting interface 2480 that will be described below. The storage devices 2300a and 2300b may be devices to which a standard protocol, such as a universal flash storage (UFS), an embedded multi-media card (eMMC), or a non-volatile memory express (NVMe), is applied, without being limited thereto.

The image capturing device 2410 may capture still images or moving images. The image capturing device 2410 may include a camera, a camcorder, and/or a webcam.

The user input device 2420 may receive various types of data input by a user of the system 2000 and include a touch pad, a keypad, a keyboard, a mouse, and/or a microphone.

The sensor 2430 may detect various types of physical quantities, which may be obtained from the outside of the system 2000, and convert the detected physical quantities into electric signals. The sensor 2430 may include a temperature sensor, a pressure sensor, an illuminance sensor, a position sensor, an acceleration sensor, a biosensor, and/or a gyroscope sensor.

The communication device 2440 may transmit and receive signals between other devices outside the system 2000 according to various communication protocols. The communication device 2440 may include an antenna, a transceiver, and/or a modem.

The display 2450 and the speaker 2460 may serve as output devices configured to respectively output visual information and auditory information to the user of the system 2000.

The power supplying device 2470 may appropriately convert power supplied from a battery (not shown) embedded in the system 2000 and/or an external power source, and supply the converted power to each of components of the system 2000.

The connecting interface 2480 may provide connection between the system 2000 and an external device, which is connected to the system 2000 and capable of transmitting and receiving data to and from the system 2000. The connecting interface 2480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In an embodiment, the image capture device 2410 may include an image system or a multi-camera described with reference to FIGS. 1 to 17.

According to the present disclosure, an image signal processor having improved performance and reduced power consumption, an operation method of the image signal processor, and an image sensor device including the image signal processor are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image signal processor, comprising:
a binning and crop module configured to receive a first input image from a first image sensor device and to perform a binning and crop operation on the first input image to generate a first image having a first resolution;
a Bayer domain processing module configured to perform a Bayer domain processing on the first image to generate a second image having a second resolution;
an RGB domain processing module configured to perform RGB domain processing on the second image to generate a third image having a third resolution, the RGB domain processing comprising converting the second image from a Bayer domain to an RGB domain; and
a YUV domain processing module configured to perform YUV domain processing on the third image to generate an output image, the YUV domain processing comprising converting the third image from the RGB domain to a YUV domain,
wherein the first resolution is higher than the second resolution.

2. The image signal processor of claim 1, wherein the second resolution matches the third resolution.

3. The image signal processor of claim 1, wherein the second resolution matches a resolution of the output image.

4. The image signal processor of claim 1, wherein the YUV domain processing performed in the YUV domain processing module comprises at least one of a spatial de-noising operation, a temporal de-noising operation, a motion compensation operation, a tone mapping operation, a detail enhance operation, and a sharpening operation.

5. The image signal processor of claim 1, wherein the Bayer domain processing module is further configured to generate frame information about the first image, and
wherein the frame information comprises at least one of image pyramid information about one or more areas of the first image, average information for each area of the one or more areas, distribution information for each area of the one or more areas, histogram information for each area of the one or more areas, and motion information.

6. The image signal processor of claim 5, wherein the frame information is stored in a memory,
wherein the RGB domain processing module is further configured to access the frame information from the memory, and
wherein the YUV domain processing module is further configured to access the frame information from the memory.

7. The image signal processor of claim 1, wherein the Bayer domain processing performed in the Bayer domain processing module comprises a downscaling operation.

8. The image signal processor of claim 1, wherein the binning and crop module is further configured to store the first image into a memory, and
wherein the Bayer domain processing module is further configured to read the first image from the memory.

9. The image signal processor of claim 8, wherein the YUV domain processing module is further configured to:
store the third image into the memory; and
access the third image stored in the memory for a temporal de-noising operation.

10. The image signal processor of claim 1, wherein an input color pattern of the input image matches a filter color pattern of a color filter array included in the first image sensor device,
wherein a first color pattern of the first image comprises a Bayer color pattern,
wherein a second color pattern of the second image comprises an RGB color pattern, and
wherein a third color pattern of the third image comprises a YUV color pattern.

11. An operation method of an image signal processor, the operation method comprising:
performing Bayer domain processing on a first image having a first resolution to generate a second image having a second resolution;
performing RGB domain processing on the second image to generate a third image having a third resolution, the RGB domain processing comprising converting the second image from a Bayer domain to an RGB domain; and
performing YUV domain processing on the third image to generate an output image, the YUV domain processing comprising converting the third image from the RGB domain to a YUV domain,
wherein the YUV domain processing further comprises at least one of a spatial de-noising operation, a temporal de-noising operation, a motion compensation operation, a tone mapping operation, a detail enhance operation, and a sharpening operation, and
wherein the first resolution is higher than the second resolution.

12. The operation method of claim 11, wherein the second resolution matches the third resolution.

13. The operation method of claim 11, wherein the second resolution matches a resolution of the output image.

14. The operation method of claim 11, further comprising:
receiving, from an image sensor device, an input image; and
performing a binning and crop operation on the input image to generate the first image.

15. The operation method of claim 14, further comprising:
storing the first image in a memory; and
accessing the first image from the memory,
wherein the performing of the Bayer domain processing comprises performing the Bayer domain processing on the accessed first image.

16. An operation method of an image signal processor, the operation method comprising:
receiving, from an image sensor device, an input image;
performing a binning and crop operation on the input image to generate a first image having a first resolution;
storing the first image in a memory;
accessing the first image from the memory;
performing Bayer domain processing on the accessed first image to generate a second image having a second resolution;
performing RGB domain processing on the second image to generate a third image having a third resolution, the RGB domain processing comprising converting the second image from a Bayer domain to an RGB domain; and
performing YUV domain processing on the third image to generate an output image, the YUV domain processing comprising converting the third image from the RGB domain to a YUV domain,
wherein the first resolution is higher than the second resolution.

17. The operation method of claim 16, wherein the second resolution matches the third resolution.

18. The operation method of claim 16, wherein the second resolution matches a resolution of the output image.

19. The operation method of claim 16, wherein the performing of the YUV domain processing further comprises performing at least one of a spatial de-noising operation, a temporal de-noising operation, a motion compensation operation, a tone mapping operation, a detail enhance operation, and a sharpening operation.

20. The operation method of claim 16, wherein the performing of the Bayer domain processing comprises performing a downscaling operation on the accessed first image.

* * * * *